US012756428B2

(12) United States Patent
Shaban et al.

(10) Patent No.: US 12,756,428 B2
(45) Date of Patent: Oct. 6, 2026

(54) METHODS AND SYSTEMS FOR SENSING-BASED CHANNEL RECONSTRUCTION AND TRACKING

(71) Applicant: Huawei Technologies Co., Ltd., Shenzhen (CN)

(72) Inventors: Ahmed Wagdy Abdelwahab Shaban, Kanata (CA); Alireza Bayesteh, Brossard (CA); Hamidreza Farmanbar, Ottawa (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 18/900,076

(22) Filed: Sep. 27, 2024

(65) Prior Publication Data

US 2025/0062795 A1 Feb. 20, 2025

Related U.S. Application Data

(63) Continuation of application No. PCT/CN2022/084150, filed on Mar. 30, 2022.

(51) Int. Cl.
*H04B 7/04* (2017.01)
*H04B 7/08* (2006.01)

(52) U.S. Cl.
CPC ......... *H04B 7/04013* (2023.05); *H04B 7/086* (2013.01)

(58) Field of Classification Search
CPC ................ H04B 7/04013; H04B 7/086; H04B 7/0695; H04W 36/0061; H04W 84/06
See application file for complete search history.

(56) References Cited

U.S. PATENT DOCUMENTS

2012/0302177 A1 11/2012 Maruyama
2016/0353271 A1 12/2016 Stephenne
(Continued)

FOREIGN PATENT DOCUMENTS

CN 107076842 B 3/2021
WO 2020096506 A1 5/2020

OTHER PUBLICATIONS

Sur et al., "BeamSpy: Enabling Robust 60 GHz Links Under Blockage", Proceedings of the 13th USENIX Symposium on Networked Systems Design and Implementation (NSDI '16), Mar. 16-18, 2016, 15 Pages, Santa Clara, CA, USA.
(Continued)

*Primary Examiner* — Sung S Ahn
(74) *Attorney, Agent, or Firm* — Slater Matsil, LLP

(57) ABSTRACT

Some embodiments of the present disclosure provide for a determination, transmission, and reception of lists of visible virtual transmission points. A virtual transmission point is defined based on a signal from a transmission-reception point reflecting off a reflector before arriving at a location in a wireless communication environment. On the basis of the lists and the location of a given device, the transmission-reception point or a device in the environment may reconstruct and track channel subspaces related to a communication. The channel subspaces may relate to angles of departure of signals that reach the given device. The channel subspaces may relate to the angles of arrival of signals that reach the given device.

20 Claims, 12 Drawing Sheets

(56) References Cited

U.S. PATENT DOCUMENTS

| | | | | |
|---|---|---|---|---|
| 2023/0089054 | A1* | 3/2023 | Gurelli | H04B 7/04013 342/378 |
| 2023/0354248 | A1* | 11/2023 | Hirzallah | G01S 7/417 |
| 2024/0201356 | A1* | 6/2024 | Dai | G01S 7/006 |

OTHER PUBLICATIONS

Zte et al., "Discussion on DL MIMO transmission for NR", 3GPP TSG RAN WG1 Meeting #86bis, R1-1608670, Oct. 10-14, 2016, 6 Pages, Lisbon, Portugal.

* cited by examiner

METHODS AND SYSTEMS FOR SENSING-BASED CHANNEL RECONSTRUCTION AND TRACKING

CROSS-REFERENCE TO RELATED APPLICATIONS

This application is a continuation of International Application No. PCT/CN2022/084150, filed on Mar. 30, 2022, the disclosure of which is hereby incorporated by reference in its entirety.

TECHNICAL FIELD

The present disclosure relates to channel reconstruction and tracking in a wireless communication network.

BACKGROUND

It is known that a wireless communication network benefits from acquiring accurate and fresh channel state information (CSI) at all communication terminals. Accurate and fresh CSI allows elements of the wireless communication network to theoretically achieve network capacity by taking advantage of new wireless technologies such massive multiple input multiple output (MIMO), millimeter wave (mmWave) frequency bands, and intelligent reflective surfaces.

CSI acquisition in current wireless systems may be considered to be a training-based channel estimation problem, wherein one side (e.g., a transmitter side, TX) transmits training signals (e.g., reference signals or pilot signals) to enable estimation of the CSI at the other side (e.g., a receiver side, RX). The TX side may acquire a CSI estimate either by exploiting the channel reciprocity property in a time-division duplex (TDD) system, or by receiving feedback from the receiver, with the feedback including a CSI estimate obtained by the receiver.

Channel estimation can be classified into two main classes. One main class is traditional channel estimation, wherein a channel matrix is directly estimated from training signals. Another main class is parametric channel estimation, wherein parameters of a channel are estimated and then a channel matrix is reconstructed as a function of these parameters. Although traditional channel estimation may provide higher estimation accuracy in low-dimensional systems, parametric channel estimation may be more efficient in high-dimensional applications, with the efficiency measured in terms of signaling and feedback overhead. As a result, parametric channel estimation techniques are typically favored for mmWave frequency bands and for massive MIMO applications.

Conventional parametric channel estimation for high-dimensional applications mainly operates by representing the channel as a function of different channel paths, where each channel path has different parameters, namely, angle of arrival (AoA), angle of departure (AoD), and power. As a result, the majority of known channel estimation techniques in the parametric channel estimation class are mainly concerned with obtaining estimates for AoAs and AoDs, and are aimed at reconstructing the channel subspaces based on the AoA estimates and the AoD estimates. These channel estimation techniques involve sending spatially-multiplexed training signals to facilitate exhaustive sensing of the different arrival directions and the different departure directions.

The majority of parametric channel estimation techniques can be further categorized into three main categorizes. The first category includes beam search codebook-based approaches. One codebook-based approach uses fixed-resolution codebooks. Another codebook-based approach is a multi-phase hierarchical procedure using multi-resolution codebooks.

In these codebook-based approaches, a beam sweeping procedure, which utilizes either fixed or multi-resolution codebooks, is considered first at both transmission point (TP) or user equipment (UE). Then, the beam sweeping procedure is followed by measuring and reporting stages. The goal of the measuring and reporting stages is to identify a strongest beam pair. The strongest beam pair may be identified based on a signal to noise ratio measured at the UE side. Subsequent to the measuring and reporting stages, another round of training signals (e.g., CSI reference signals, "CSI-RS") may be transmitted over the strongest beam pairs to, thereby, enable estimating the channel given the applied beamformers.

This approach can result in excessive delays. The delays may be blamed on the time associated with sending pilot or training signals and waiting for feedback frames for each beam direction. In addition, this approach may suffer from significant signaling overhead. The amount of overhead may increase linearly (fixed-resolution) or increase logarithmically (multi-resolution) as a number of beam directions increases. Moreover, the first category of approaches require the use of adaptive power control for multi-resolution beams to achieve power gain and coverage.

The second category of parametric channel estimation techniques includes compressive sensing-based approaches. In compressive sensing-based approaches, the channel estimation procedure exploits sparsity in the mmWave channels. More particularly, the sparsity is exploited to decrease signaling overhead and feedback overhead.

However, the decrease in overhead causes increased computational complexity, resulting in complex optimization problems, such as semi-definite programming. Complex optimization problems involve computationally-intensive operations, thereby making the second category of approaches impractical for real-time applications.

The third category of parametric channel estimation techniques includes approaches based on look-up-tables or based on databases. These approaches rely on building a dictionary of the channel paths for each UE position and each channel instance. The dictionary of the channel paths may also be called a "paths skeleton (PS)." Building such a dictionary may be accomplished using traditional beam sweeping/search and training procedures. However, these third category approaches may depend heavily on UE measurements and feedback to build the paths skeletons, thereby increasing the delay, and signaling and feedback overheads. Furthermore, these third category approaches occupy a large amount of memory in hardware and of signaling overhead because the size of the skeletons database can be huge, particularly for those cases where the paths skeletons change dramatically as the UE moves from position to position. Furthermore, these third category approaches may fail to capture the full dynamicity of the environment.

Accordingly, improvements in channel reconstruction and tracking are generally desired.

SUMMARY

Aspects of the present application relate to reconstructing and tracking channel subspaces while implementing relatively low overhead for sensing/training, relatively fewer UE measurements and, consequently, less feedback. In addition, aspects of the present application may be shown to enhance tracking procedures. Furthermore, aspects of the present application may be shown to reduce a frequency that a communication system experiences a blockage and to obviate the use of stale channel estimates.

Known channel subspace reconstruction methods are known to be plagued with excessive delays, training/signaling overheads and relatively high computational complexity.

A wireless communication environment may be divided, ahead of time, into a plurality of regions. Based on a geometry of the wireless communication environment, the manner in which signals from a transmission-reception point or transceiver are expected to reach each region among the plurality of regions may be determined and recorded in a plurality of lists. The plurality of lists may be distributed among UEs in the wireless communication environment so that the UEs, upon determining their own location, may have enough information to allow the UE to select particular beam directions for communicating with the transmission-reception point. Because the geometry is worked out in advance, fewer delays may be incurred by systems employing aspects of the present application than systems employing known channel reconstruction and tracking methods. The pre-determination may also be shown to reduce training and signaling overhead and to reduce computational complexity.

According to an aspect of the present disclosure, there is provided a channel reconstruction method for a transmission-reception point. The method includes transmitting, by the transmission-reception point, a list of virtual transmission points to a device in a wireless communication environment. The list of virtual transmission points belongs to a plurality of lists, and the list of virtual transmission points comprises a virtual transmission point visible from a location in a first region of a plurality of regions of the wireless communication environment. The virtual transmission point is associated with a reflector in the wireless communication environment. Each list of the plurality of lists corresponds to a respective region of the plurality of regions. The method further includes transmitting, by the transmission-reception point, a signal to the device, based on information associated with the reflector.

In a further embodiment, the method further comprises receiving from the device, by the transmission-reception point, an indication of a second region of the plurality of regions.

In a further embodiment of any previous embodiment, the method further comprises obtaining, by the transmission-reception point, an updated list of virtual transmission points, and transmitting, by the transmission-reception point, the updated list of virtual transmission points to the device.

In a further embodiment of any previous embodiment, the method further comprises, prior to transmitting the signal, receiving, by the transmission-reception point, an indication of the first region from the device.

In a further embodiment of any previous embodiment, the information associated with the reflector comprises a plurality of angles of departure. Optionally, the information associated with the reflector comprises a dominant angle of departure among the plurality of angles of departure.

In a further embodiment of any previous embodiment, the information associated with the reflector comprises one or more of: a shape for the reflector, a position for the reflector, an orientation for the reflector, a reflection coefficient for the reflector, a velocity of the reflector, or a velocity vector of the reflector.

In a further embodiment of any previous embodiment, the method further comprises transmitting to the device, by the transmission-reception point, the information associated with the reflector.

In a further embodiment of any previous embodiment, the list of virtual transmission points comprises a first subset of virtual transmission points associated with static reflectors and a second subset of virtual transmission points associated with moving reflectors, and wherein transmitting the list of virtual transmission points comprises transmitting the first subset separately from transmitting the second subset. Optionally, transmitting the first subset comprises transmitting the first subset using radio resource control signaling. Optionally, transmitting the first subset comprises transmitting the first subset using a media access control-control element. Optionally, transmitting the second subset comprises transmitting the second subset using downlink control information.

According to an aspect of the present disclosure, there is provided a channel reconstruction method for a device in a wireless communication environment. The method includes receiving, by the device in a wireless communication environment, a list of virtual transmission points from a transmission-reception point. The list of virtual transmission points belongs to a plurality of lists, and the list of virtual transmission points comprises a virtual transmission point visible from a location in a first region of a plurality of regions of the wireless communication environment. The virtual transmission point is associated with a reflector in the wireless communication environment. Each list of the plurality of lists corresponds to a respective region of the plurality of regions. The method further includes receiving, by the device, a signal from the transmission-reception point, based on information associated with the reflector.

In a further embodiment, the method further comprises transmitting to the transmission-reception point, by the device, an indication of a second region of the plurality of regions.

In a further embodiment of any previous embodiment, the method further comprises receiving from the transmission-reception point, by the device, an updated list of virtual transmission points.

In a further embodiment of any previous embodiment, the method further comprises, prior to receiving the signal, transmitting, by the device, an indication of the first region to the transmission-reception point.

In a further embodiment of any previous embodiment, the information associated with the reflector comprises a plurality of angles of arrival. Optionally, the information associated with the reflector comprises a dominant angle of arrival among the plurality of angles of arrival.

In a further embodiment of any previous embodiment, the information associated with the reflector comprises one or more of: a shape for the reflector, a position for the reflector, an orientation for the reflector, a reflection coefficient for the reflector, a velocity of the reflector, or a velocity vector of the reflector.

In a further embodiment of any previous embodiment, the method further comprises receiving from the transmission-reception point, by the device, the information associated with the reflector.

In a further embodiment of any previous embodiment, the list of virtual transmission points comprises a first subset of virtual transmission points associated with static reflectors and a second subset of virtual transmission points associated with moving reflectors, and wherein receiving the list of virtual transmission points comprises receiving the first subset separately from receiving the second subset. Optionally, receiving the first subset comprises receiving the first subset using radio resource control signaling. Optionally, receiving the first subset comprises receiving the first subset using a media access control-control element. Optionally, receiving the second subset comprises receiving the second subset using downlink control information.

Other aspects of the present application relate to an apparatus for performing the preceding methods, and a computer-readable storage medium including instructions to carry out the preceding methods.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
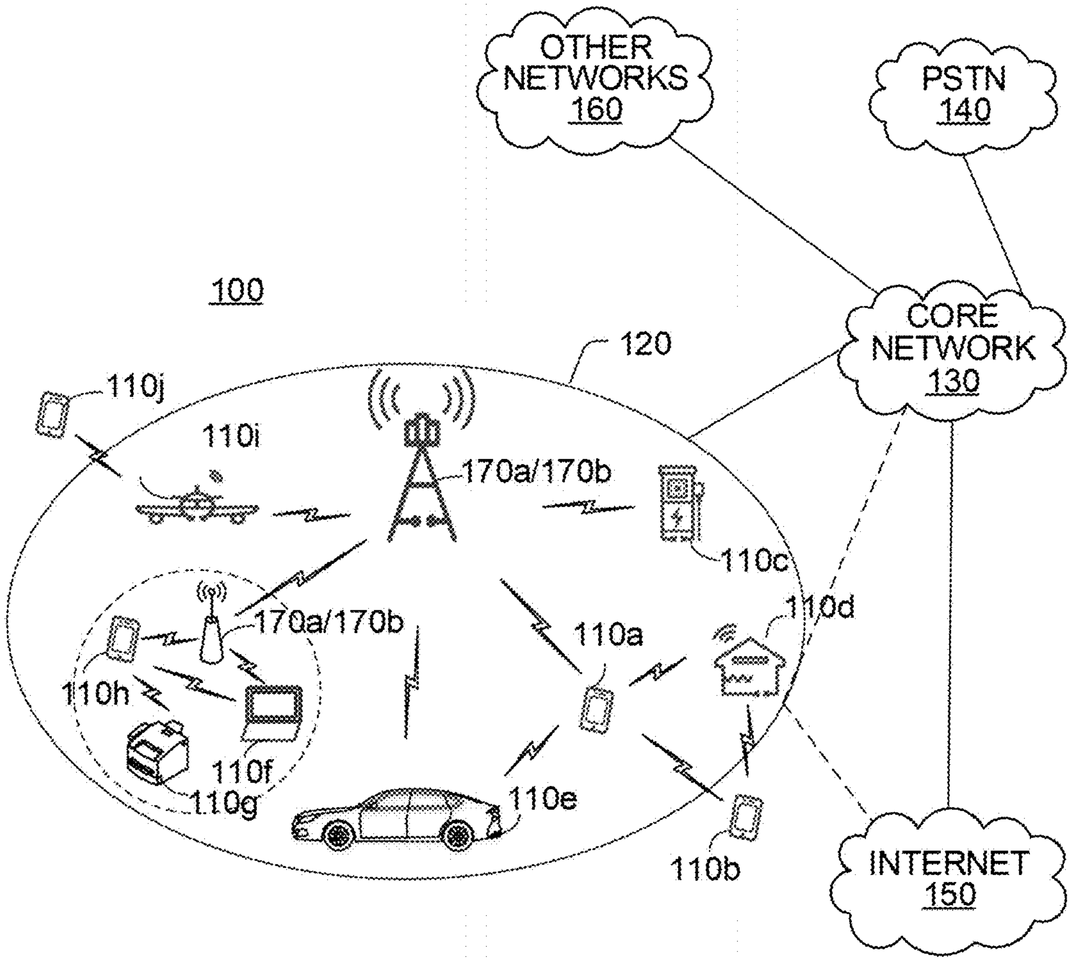
FIG. 1 illustrates, in a schematic diagram, a communication system in which embodiments of the disclosure may occur, the communication system includes multiple example electronic devices and multiple example transmission-reception points along with various networks.

Referring to FIG. 1, as an illustrative example without limitation, a simplified schematic illustration of a communication system is provided. The communication system 100 comprises a radio access network 120. The radio access network 120 may be a next generation (e.g., sixth generation, "6G," or later) radio access network, or a legacy (e.g., 5G, 4G, 3G or 2G) radio access network. One or more communication electric device (ED) 110*a*, 110*b*, 110*c*, 110*d*, 110*e*, 110*f*, 110*g*, 110*h*, 110*i*, 110*j* (generically referred to as no) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
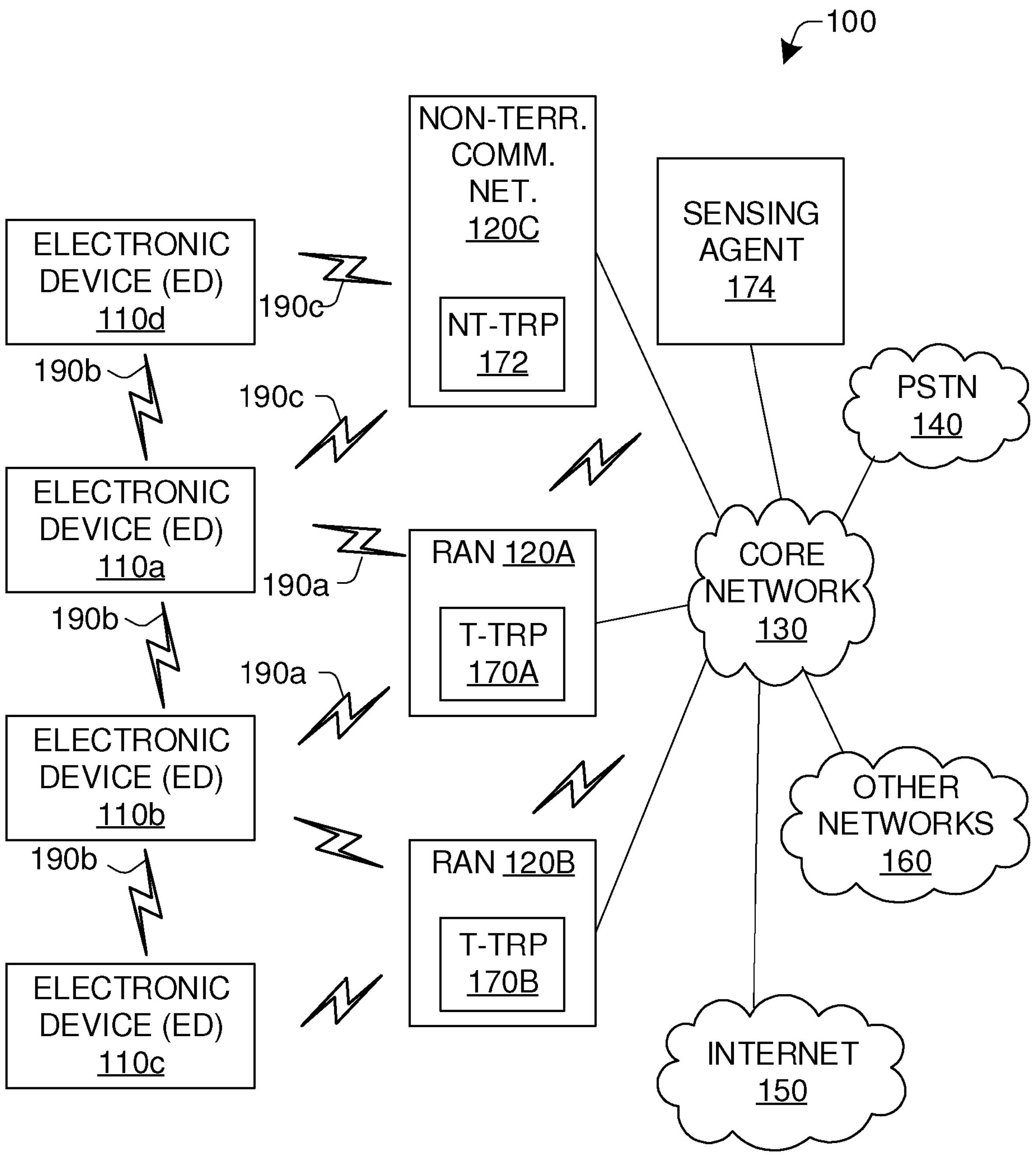
FIG. 2 illustrates, in a block diagram, the communication system of FIG. 1, the communication system includes multiple example electronic devices, an example terrestrial transmission-reception point and an example non-terrestrial transmission-reception point along with various networks.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of a terrestrial communication system and a non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing and faster physical layer link switching between terrestrial networks and non-terrestrial networks.

The terrestrial communication system and the non-terrestrial communication system could be considered sub-systems of the communication system. In the example shown in FIG. 2, the communication system 100 includes electronic devices (ED) 110*a*, 110*b*, 110*c*, 110*d* (generically referred to as ED 110), radio access networks (RANs) 120*a*, 120*b*, a non-terrestrial communication network 120*c*, a core network 130, a public switched telephone network (PSTN) 140, the Internet 150 and other networks 160. The RANs 120*a*, 120*b* include respective base stations (BSs) 170*a*, 170*b*, which may be generically referred to as terrestrial transmit and receive points (T-TRPs) 170*a*, 170*b*. The non-terrestrial communication network 120*c* includes an access node 172, which may be generically referred to as a non-terrestrial transmit and receive point (NT-TRP) 172.

Any ED no may be alternatively or additionally configured to interface, access, or communicate with any T-TRP 170*a*, 170*b* and NT-TRP 172, the Internet 150, the core network 130, the PSTN 140, the other networks 160, or any combination of the preceding. In some examples, the ED 110*a* may communicate an uplink and/or downlink transmission over a terrestrial air interface 190*a* with T-TRP 170*a*. In some examples, the EDs 110*a*, 110*b*, 110*c* and 110*d* may also communicate directly with one another via one or more sidelink air interfaces 190*b*. In some examples, the ED 110*d* may communicate an uplink and/or downlink transmission over an non-terrestrial air interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), space division multiple access (SDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The non-terrestrial air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs 110 and one or multiple NT-TRPs 175 for multicast transmission.

The RANs 120*a* and 120*b* are in communication with the core network 130 to provide the EDs 110*a*, 110*b*, 110*c* with various services such as voice, data and other services. The RANs 120*a* and 120*b* and/or the core network 130 may be in direct or indirect communication with one or more other RANs (not shown), which may or may not be directly served by core network 130 and may, or may not, employ the same radio access technology as RAN 120*a*, RAN 120*b* or both. The core network 130 may also serve as a gateway access between (i) the RANs 120*a* and 120*b* or the EDs 110*a*, 110*b*, 110*c* or both, and (ii) other networks (such as the PSTN 140, the Internet 150, and the other networks 160). In addition, some or all of the EDs 110*a*, 110*b*, 110*c* may include functionality for communicating with different wireless networks over different wireless links using different wireless technologies and/or protocols. Instead of wireless communication (or in addition thereto), the EDs 110*a*, 110*b*, 110*c* may communicate via wired communication channels to a service provider or switch (not shown) and to the Internet 150. The PSTN 140 may include circuit switched telephone networks for providing plain old telephone service (POTS). The Internet 150 may include a network of computers and subnets (intranets) or both and incorporate protocols, such as Internet Protocol (IP), Transmission Control Protocol (TCP), User Datagram Protocol (UDP). The EDs 110*a*, 110*b*, 110*c* may be multimode devices capable of operation according to multiple radio access technologies and may incorporate multiple transceivers necessary to support such.

Figure 3:
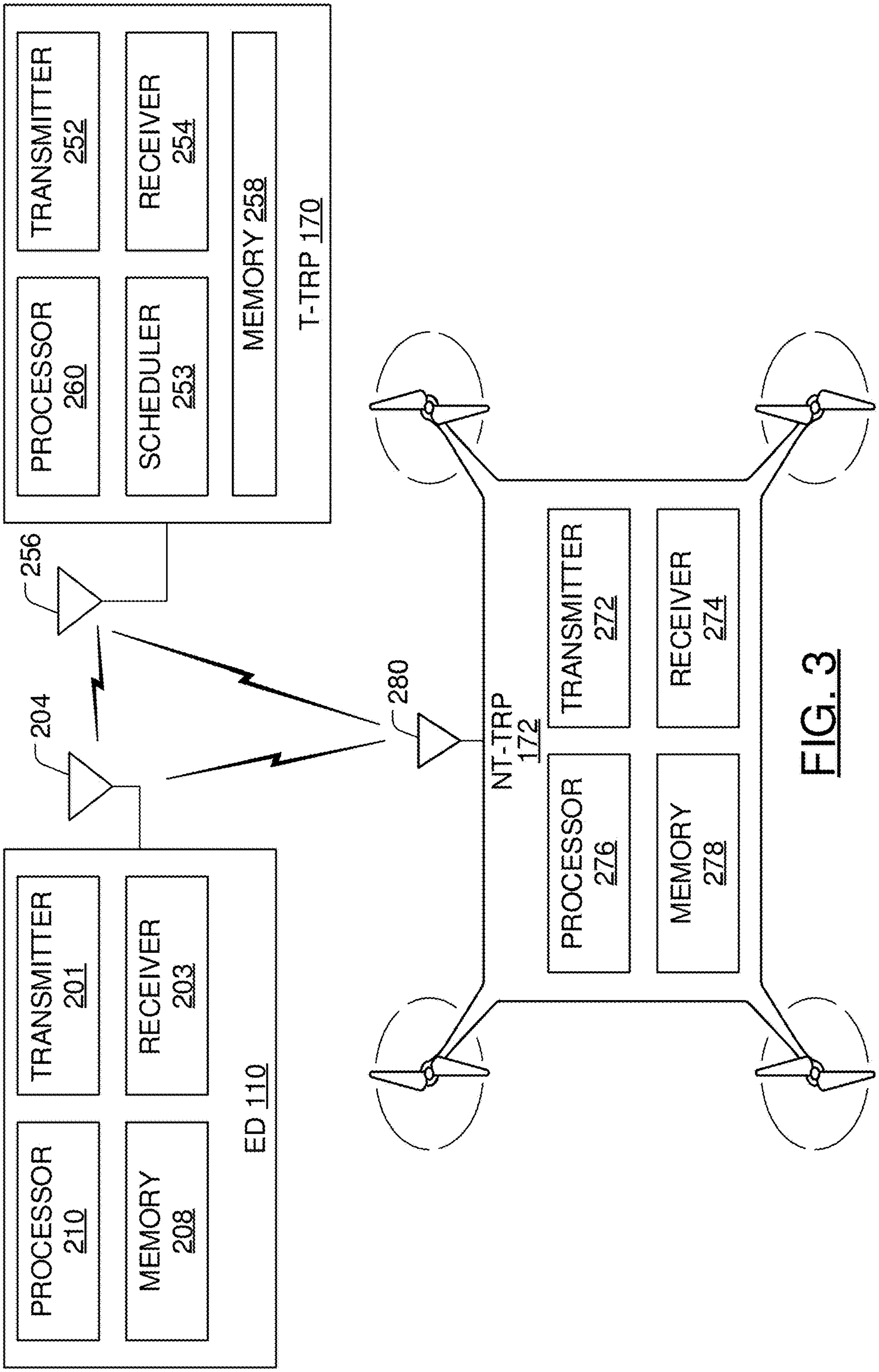
FIG. 3 illustrates, as a block diagram, elements of an example electronic device of FIG. 2, elements of an example terrestrial transmission-reception point of FIG. 2 and elements of an example non-terrestrial transmission-reception point of FIG. 2, in accordance with aspects of the present application.

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), Internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g., communication module, modem, or chip) in the forgoing devices, among other possibilities. Future generation EDs 110 may be referred to using other terms. The base stations 170*a* and 170*b* each T-TRPs and will, hereafter, be referred to as T-TRP 170. Also shown in FIG. 3, a NT-TRP will hereafter be referred to as NT-TRP 172. Each ED 110 connected to the T-TRP 170 and/or the NT-TRP 172 can be dynamically or semi-statically turned-on (i.e., established, activated or enabled), turned-off (i.e., released, deactivated or disabled) and/or configured in response to one of more of: connection availability; and connection necessity.

The ED 110 includes a transmitter 201 and a receiver 203 coupled to one or more antennas 204. Only one antenna 204 is illustrated. One, some, or all of the antennas 204 may, alternatively, be panels. The transmitter 201 and the receiver 203 may be integrated, e.g., as a transceiver. The transceiver is configured to modulate data or other content for transmission by the at least one antenna 204 or by a network interface controller (NIC). The transceiver may also be configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by one or more processing unit(s) (e.g., a processor 210). Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache and the like.

The ED 110 may further include one or more input/output devices (not shown) or interfaces (such as a wired interface to the Internet 150 in FIG. 1). The input/output devices permit interaction with a user or other devices in the network. Each input/output device includes any suitable structure for providing information to, or receiving information from, a user, such as through operation as a speaker, a microphone, a keypad, a keyboard, a display or a touch screen, including network interface communications.

The ED 110 includes the processor 210 for performing operations including those operations related to preparing a transmission for uplink transmission to the NT-TRP 172 and/or the T-TRP 170, those operations related to processing downlink transmissions received from the NT-TRP 172 and/or the T-TRP 170, and those operations related to processing sidelink transmission to and from another ED 110. Processing operations related to preparing a transmission for uplink transmission may include operations such as encoding, modulating, transmit beamforming and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g., by detecting and/or decoding the signaling). An example of signaling may be a reference signal transmitted by the NT-TRP 172 and/or by the T-TRP 170. In some embodiments, the processor 210 implements the transmit beamforming and/or the receive beamforming based on the indication of beam direction, e.g., beam angle information (BAI), received from the T-TRP 170. In some embodiments, the processor 210 may perform operations relating to network access (e.g., initial access) and/or downlink synchronization, such as operations relating to detecting a synchronization sequence, decoding and obtaining the system information, etc. In some embodiments, the processor 210 may perform channel estimation, e.g., using a reference signal received from the NT-TRP 172 and/or from the T-TRP 170.

Although not illustrated, the processor 210 may form part of the transmitter 201 and/or part of the receiver 203. Although not illustrated, the memory 208 may form part of the processor 210.

The processor 210, the processing components of the transmitter 201 and the processing components of the receiver 203 may each be implemented by the same or different one or more processors that are configured to execute instructions stored in a memory (e.g., the in memory 208). Alternatively, some or all of the processor 210, the processing components of the transmitter 201 and the processing components of the receiver 203 may each be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), a wireless router, a relay station, a remote radio head, a terrestrial node, a terrestrial network device, a terrestrial base station, a base band unit (BBU), a remote radio unit (RRU), an active antenna unit (AAU), a remote radio head (RRH), a central unit (CU), a distribute unit (DU), a positioning node, among other possibilities. The T-TRP 170 may be a macro BS, a pico BS, a relay node, a donor node, or the like, or combinations thereof. The T-TRP 170 may refer to the forgoing devices or refer to apparatus (e.g., a communication module, a modem or a chip) in the forgoing devices.

In some embodiments, the parts of the T-TRP 170 may be distributed. For example, some of the modules of the T-TRP 170 may be located remote from the equipment that houses antennas 256 for the T-TRP 170, and may be coupled to the equipment that houses antennas 256 over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment that houses antennas 256 of the T-TRP 170. The modules may also be coupled to other T-TRPs. In some embodiments, the T-TRP 170 may actually be a plurality of T-TRPs that are operating together to serve the ED 110, e.g., through the use of coordinated multipoint transmissions.

As illustrated in FIG. 3, the T-TRP 170 includes at least one transmitter 252 and at least one receiver 254 coupled to one or more antennas 256. Only one antenna 256 is illustrated. One, some, or all of the antennas 256 may, alternatively, be panels. The transmitter 252 and the receiver 254 may be integrated as a transceiver. The T-TRP 170 further includes a processor 260 for performing operations including those related to: preparing a transmission for downlink transmission to the ED 110; processing an uplink transmission received from the ED 110; preparing a transmission for backhaul transmission to the NT-TRP 172; and processing a transmission received over backhaul from the NT-TRP 172. Processing operations related to preparing a transmission for downlink or backhaul transmission may include operations such as encoding, modulating, precoding (e.g., "MIMO," precoding), transmit beamforming and generating symbols for transmission. Processing operations related to processing received transmissions in the uplink or over backhaul may include operations such as receive beamforming, demodulating received symbols and decoding received symbols. The processor 260 may also perform operations relating to network access (e.g., initial access) and/or downlink synchronization, such as generating the content of synchronization signal blocks (SSBs), generating the system information, etc. In some embodiments, the processor 260 also generates an indication of beam direction, e.g., BAI, which may be scheduled for transmission by a scheduler 253. The processor 260 performs other network-side processing operations described herein, such as determining the location of the ED 110, determining where to deploy the NT-TRP 172, etc. In some embodiments, the processor 260 may generate signaling, e.g., to configure one or more parameters of the ED 110 and/or one or more parameters of the NT-TRP 172. Any signaling generated by the processor 260 is sent by the transmitter 252. Note that "signaling," as used herein, may alternatively be called control signaling. Dynamic signaling may be transmitted in a control channel, e.g., a physical downlink control channel (PDCCH) and static, or semi-static, higher layer signaling may be included in a packet transmitted in a data channel, e.g., in a physical downlink shared channel (PDSCH).

The scheduler 253 may be coupled to the processor 260. The scheduler 253 may be included within, or operated separately from, the T-TRP 170. The scheduler 253 may schedule uplink, downlink and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or part of the receiver 254. Also, although not illustrated, the processor 260 may implement the scheduler 253. Although not illustrated, the memory 258 may form part of the processor 260.

The processor 260, the scheduler 253, the processing components of the transmitter 252 and the processing components of the receiver 254 may each be implemented by the same, or different one of, one or more processors that are configured to execute instructions stored in a memory, e.g., in the memory 258. Alternatively, some or all of the processor 260, the scheduler 253, the processing components of the transmitter 252 and the processing components of the receiver 254 may be implemented using dedicated circuitry, such as a FPGA, a GPU or an ASIC.

Notably, the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110; processing an uplink transmission received from the ED 110; preparing a transmission for backhaul transmission to T-TRP 170; and processing a transmission received over backhaul from the T-TRP 170. Processing operations related to preparing a transmission for downlink or backhaul transmission may include operations such as encoding, modulating, precoding (e.g., MIMO precoding), transmit beamforming and generating symbols for transmission. Processing operations related to processing received transmissions in the uplink or over backhaul may include operations such as receive beamforming, demodulating received signals and decoding received symbols. In some embodiments, the processor 276 implements the transmit beamforming and/or receive beamforming based on beam direction information (e.g., BAI) received from the T-TRP 170. In some embodiments, the processor 276 may generate signaling, e.g., to configure one or more parameters of the ED 110. In some embodiments, the NT-TRP 172 implements physical layer processing but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or part of the receiver 274. Although not illustrated, the memory 278 may form part of the processor 276.

The processor 276, the processing components of the transmitter 272 and the processing components of the receiver 274 may each be implemented by the same or different one or more processors that are configured to execute instructions stored in a memory, e.g., in the memory 278. Alternatively, some or all of the processor 276, the processing components of the transmitter 272 and the processing components of the receiver 274 may be implemented using dedicated circuitry, such as a programmed FPGA, a GPU or an ASIC. In some embodiments, the NT-TRP 172 may actually be a plurality of NT-TRPs that are operating together to serve the ED 110, e.g., through coordinated multipoint transmissions.

The T-TRP 170, the NT-TRP 172, and/or the ED 110 may include other components, but these have been omitted for the sake of clarity.

Figure 4:
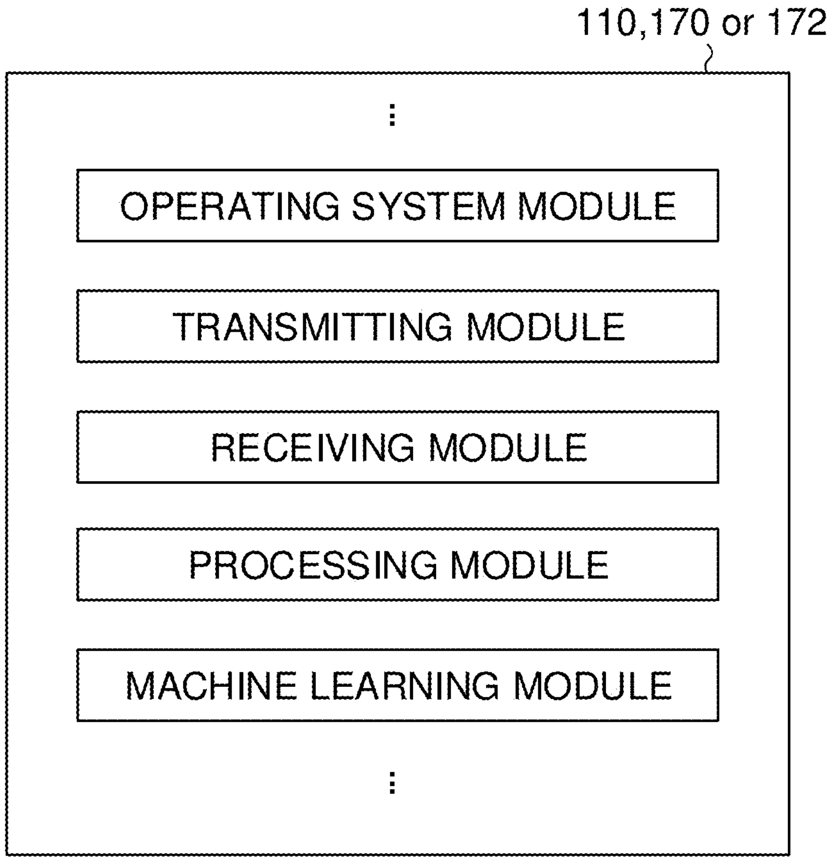
FIG. 4 illustrates, as a block diagram, various modules that may be included in an example electronic device, an example terrestrial transmission-reception point and an example non-terrestrial transmission-reception point, in accordance with aspects of the present application.

One or more steps of the embodiment methods provided herein may be performed by corresponding units or modules, according to FIG. 4. FIG. 4 illustrates units or modules in a device, such as in the ED 110, in the T-TRP 170 or in the NT-TRP 172. For example, a signal may be transmitted by a transmitting unit or by a transmitting module. A signal may be received by a receiving unit or by a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU or an ASIC. It will be appreciated that where the modules are implemented using software for execution by a processor, for example, the modules may be retrieved by a processor, in whole or part as needed, individually or together for processing, in single or multiple instances, and that the modules themselves may include instructions for further deployment and instantiation.

Additional details regarding the EDs 110, the T-TRP 170 and the NT-TRP 172 are known to those of skill in the art. As such, these details are omitted here.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g., data) over a wireless communications link. The wireless communications link may support a link between a radio access network and user equipment (e.g., a "Uu" link), and/or the wireless communications link may support a link between device and device, such as between two user equipments (e.g., a "sidelink"), and/or the wireless communications link may support a link between a non-terrestrial (NT)-communication network and user equipment (UE). The following are some examples for the above components.

A waveform component may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform and low Peak to Average Power Ratio Waveform (low PAPR WF).

A frame structure component may specify a configuration of a frame or group of frames. The frame structure component may indicate one or more of a time, frequency, pilot signature, code or other parameter of the frame or group of frames. More details of frame structure will be discussed hereinafter.

A multiple access scheme component may specify multiple access technique options, including technologies defining how communicating devices share a common physical channel, such as: TDMA; FDMA; CDMA; SDMA; SC-FDMA; Low Density Signature Multicarrier CDMA (LDS-MC-CDMA); Non-Orthogonal Multiple Access (NOMA); Pattern Division Multiple Access (PDMA); Lattice Partition Multiple Access (LPMA); Resource Spread Multiple Access (RSMA); and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources; and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission and a re-transmission mechanism.

A coding and modulation component may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all" concept. For example, it may be that the components within the air interface cannot be changed or adapted once the air interface is defined. In some implementations, only limited parameters or modes of an air interface, such as a cyclic prefix (CP) length or a MIMO mode, can be configured. In some embodiments, an air interface design may provide a unified or flexible framework to support frequencies below known 6 GHz bands and frequencies beyond the 6 GHz bands (e.g., mmWave bands) for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain and a frequency domain self-contained design may support more flexible RAN slicing through channel resource sharing between different services in both frequency and time.

A frame structure is a feature of the wireless communication physical layer that defines a time domain signal transmission structure to, e.g., allow for timing reference and timing alignment of basic time domain transmission units. Wireless communication between communicating devices may occur on time-frequency resources governed by a frame structure. The frame structure may, sometimes, instead be called a radio frame structure.

Depending upon the frame structure and/or configuration of frames in the frame structure, frequency division duplex (FDD) and/or time-division duplex (TDD) and/or full duplex (FD) communication may be possible. FDD communication is when transmissions in different directions (e.g., uplink vs. downlink) occur in different frequency bands. TDD communication is when transmissions in different directions (e.g., uplink vs. downlink) occur over different time durations. FD communication is when transmission and reception occurs on the same time-frequency resource, i.e., a device can both transmit and receive on the same frequency resource contemporaneously.

One example of a frame structure is a frame structure, specified for use in the known long-term evolution (LTE) cellular systems, having the following specifications: each frame is 10 ms in duration; each frame has 10 subframes, which subframes are each 1 ms in duration; each subframe includes two slots, each of which slots is 0.5 ms in duration; each slot is for the transmission of seven OFDM symbols (assuming normal CP); each OFDM symbol has a symbol duration and a particular bandwidth (or partial bandwidth or bandwidth partition) related to the number of subcarriers and subcarrier spacing; the frame structure is based on OFDM waveform parameters such as subcarrier spacing and CP length (where the CP has a fixed length or limited length options); and the switching gap between uplink and downlink in TDD is specified as the integer time of OFDM symbol duration.

Another example of a frame structure is a frame structure, specified for use in the known new radio (NR) cellular systems, having the following specifications: multiple subcarrier spacings are supported, each subcarrier spacing corresponding to a respective numerology; the frame structure depends on the numerology but, in any case, the frame length is set at 10 ms and each frame consists of ten subframes, each subframe of 1 ms duration; a slot is defined as 14 OFDM symbols; and slot length depends upon the numerology. For example, the NR frame structure for normal CP 15 kHz subcarrier spacing ("numerology 1") and the NR frame structure for normal CP 30 kHz subcarrier spacing ("numerology 2") are different. For 15 kHz subcarrier spacing, the slot length is 1 ms and, for 30 kHz subcarrier spacing, the slot length is 0.5 ms. The NR frame structure may have more flexibility than the LTE frame structure.

Another example of a frame structure is, e.g., for use in a 6G network or a later network. In a flexible frame structure, a symbol block may be defined to have a duration that is the minimum duration of time that may be scheduled in the flexible frame structure. A symbol block may be a unit of transmission having an optional redundancy portion (e.g., CP portion) and an information (e.g., data) portion. An OFDM symbol is an example of a symbol block. A symbol block may alternatively be called a symbol. Embodiments of flexible frame structures include different parameters that may be configurable, e.g., frame length, subframe length, symbol block length, etc. A non-exhaustive list of possible configurable parameters, in some embodiments of a flexible frame structure, includes: frame length; subframe duration; slot configuration; subcarrier spacing (SCS); flexible transmission duration of basic transmission unit; and flexible switch gap.

The frame length need not be limited to 10 ms and the frame length may be configurable and change over time. In some embodiments, each frame includes one or multiple downlink synchronization channels and/or one or multiple downlink broadcast channels and each synchronization channel and/or broadcast channel may be transmitted in a different direction by different beamforming. The frame length may be more than one possible value and configured based on the application scenario. For example, autonomous vehicles may require relatively fast initial access, in which case the frame length may be set to 5 ms for autonomous vehicle applications. As another example, smart meters on houses may not require fast initial access, in which case the frame length may be set as 20 ms for smart meter applications.

A subframe might or might not be defined in the flexible frame structure, depending upon the implementation. For example, a frame may be defined to include slots, but no subframes. In frames in which a subframe is defined, e.g., for time domain alignment, the duration of the subframe may be configurable. For example, a subframe may be configured to have a length of 0.1 ms or 0.2 ms or 0.5 ms or 1 ms or 2 ms or 5 ms, etc. In some embodiments, if a subframe is not needed in a particular scenario, then the subframe length may be defined to be the same as the frame length or not defined.

A slot might or might not be defined in the flexible frame structure, depending upon the implementation. In frames in which a slot is defined, then the definition of a slot (e.g., in time duration and/or in number of symbol blocks) may be configurable. In one embodiment, the slot configuration is common to all UEs 110 or a group of UEs 110. For this case, the slot configuration information may be transmitted to the UEs 110 in a broadcast channel or common control channel(s). In other embodiments, the slot configuration may be UE specific, in which case the slot configuration information may be transmitted in a UE-specific control channel. In some embodiments, the slot configuration signaling can be transmitted together with frame configuration signaling and/or subframe configuration signaling. In other embodiments, the slot configuration may be transmitted independently from the frame configuration signaling and/or subframe configuration signaling. In general, the slot configuration may be system common, base station common, UE group common or UE specific.

The SCS may range from 15 KHz to 480 KHz. The SCS may vary with the frequency of the spectrum and/or maximum UE speed to minimize the impact of Doppler shift and phase noise. In some examples, there may be separate transmission and reception frames and the SCS of symbols in the reception frame structure may be configured independently from the SCS of symbols in the transmission frame structure. The SCS in a reception frame may be different from the SCS in a transmission frame. In some examples, the SCS of each transmission frame may be half the SCS of each reception frame. If the SCS between a reception frame and a transmission frame is different, the difference does not necessarily have to scale by a factor of two, e.g., if more flexible symbol durations are implemented using inverse discrete Fourier transform (IDFT) instead of fast Fourier transform (FFT). Additional examples of frame structures can be used with different SCSs.

The basic transmission unit may be a symbol block (alternatively called a symbol), which, in general, includes a redundancy portion (referred to as the CP) and an information (e.g., data) portion. In some embodiments, the CP may be omitted from the symbol block. The CP length may be flexible and configurable. The CP length may be fixed within a frame or flexible within a frame and the CP length may possibly change from one frame to another, or from one group of frames to another group of frames, or from one subframe to another subframe, or from one slot to another slot, or dynamically from one scheduling to another scheduling. The information (e.g., data) portion may be flexible and configurable. Another possible parameter relating to a symbol block that may be defined is ratio of CP duration to information (e.g., data) duration. In some embodiments, the symbol block length may be adjusted according to: a channel condition (e.g., multi-path delay, Doppler); and/or a latency requirement; and/or an available time duration. As another example, a symbol block length may be adjusted to fit an available time duration in the frame.

A frame may include both a downlink portion, for downlink transmissions from a base station 170, and an uplink portion, for uplink transmissions from the UEs 110. A gap may be present between each uplink and downlink portion, which gap is referred to as a switching gap. The switching gap length (duration) may be configurable. A switching gap duration may be fixed within a frame or flexible within a frame and a switching gap duration may possibly change from one frame to another, or from one group of frames to another group of frames, or from one subframe to another subframe, or from one slot to another slot, or dynamically from one scheduling to another scheduling.

A device, such as a base station 170, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g., the center frequency, the lowest frequency or the highest frequency of the carrier. A carrier may be on a licensed spectrum or an unlicensed spectrum. Wireless communication with the device may also, or instead, occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and, optionally, one or multiple uplink resources. A cell may include one or multiple uplink resources and, optionally, one or multiple downlink resources. A cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may, instead or additionally, include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g., a carrier may have a bandwidth of 20 MHz and consist of one BWP or a carrier may have a bandwidth of 80 MHz and consist of two adjacent contiguous BWPs, etc. In other embodiments, a BWP may have one or more carriers, e.g., a BWP may have a bandwidth of 40 MHz and consist of two adjacent contiguous carriers, where each carrier has a bandwidth of 20 MHz. In some embodiments, a BWP may comprise non-contiguous spectrum resources, which consists of multiple non-contiguous multiple carriers, where the first carrier of the non-contiguous multiple carriers may be in the mmW band, the second carrier may be in a low band (such as the 2 GHz band), the third carrier (if it exists) may be in THz band and the fourth carrier (if it exists) may be in visible light band. Resources in one carrier which belong to the BWP may be contiguous or non-contiguous. In some embodiments, a BWP has non-contiguous spectrum resources on one carrier.

Wireless communication may occur over an occupied bandwidth. The occupied bandwidth may be defined as the width of a frequency band such that, below the lower and above the upper frequency limits, the mean powers emitted are each equal to a specified percentage, $\beta/2$, of the total mean transmitted power, for example, the value of $\beta/2$ is taken as 0-5%.

The carrier, the BWP or the occupied bandwidth may be signaled by a network device (e.g., by a base station 170) dynamically, e.g., in physical layer control signaling such as the known downlink control channel (DCI), or semi-statically, e.g., in radio resource control (RRC) signaling or in signaling in the medium access control (MAC) layer, or be predefined based on the application scenario; or be determined by the UE 110 as a function of other parameters that are known by the UE 110, or may be fixed, e.g., by a standard.

User Equipment (UE) position information is often used in cellular communication networks to improve various performance metrics for the network. Such performance metrics may, for example, include capacity, agility and efficiency. The improvement may be achieved when elements of the network exploit the position, the behavior, the mobility pattern, etc., of the UE in the context of a priori information describing a wireless environment in which the UE is operating.

A sensing system may be used to help gather UE pose information, including UE location in a global coordinate system, UE velocity and direction of movement in the global coordinate system, orientation information and the information about the wireless environment. "Location" is also known as "position" and these two terms may be used interchangeably herein. Examples of well-known sensing systems include RADAR (Radio Detection and Ranging) and LIDAR (Light Detection and Ranging). While the sensing system can be separate from the communication system, it could be advantageous to gather the information using an integrated system, which reduces the hardware (and cost) in the system as well as the time, frequency or spatial resources needed to perform both functionalities. However, using the communication system hardware to perform sensing of UE pose and environment information is a highly challenging and open problem. The difficulty of the problem relates to factors such as the limited resolution of the communication system, the dynamicity of the environment, and the huge number of objects whose electromagnetic properties and position are to be estimated.

Accordingly, integrated sensing and communication (also known as integrated communication and sensing) is a desirable feature in existing and future communication systems.

Any or all of the EDs 110 and BS 170 may be sensing nodes in the system 100. Sensing nodes are network entities that perform sensing by transmitting and receiving sensing signals. Some sensing nodes are communication equipment that perform both communications and sensing. However, it is possible that some sensing nodes do not perform communications and are, instead, dedicated to sensing. The sensing agent 174 is an example of a sensing node that is dedicated to sensing. Unlike the EDs 110 and BS 170, the sensing agent 174 does not transmit or receive communication signals. However, the sensing agent 174 may communicate configuration information, sensing information, signaling information, or other information within the communication system 100. The sensing agent 174 may be in communication with the core network 130 to communicate information with the rest of the communication system 100. By way of example, the sensing agent 174 may determine the location of the ED 110*a*, and transmit this information to the base station 170*a* via the core network 130. Although only one sensing agent 174 is shown in FIG. 2, any number of sensing agents may be implemented in the communication system 100. In some embodiments, one or more sensing agents may be implemented at one or more of the RANs 120.

A sensing node may combine sensing-based techniques with reference signal-based techniques to enhance UE pose determination. This type of sensing node may also be known as a sensing management function (SMF). In some networks, the SMF may also be known as a location management function (LMF). The SMF may be implemented as a physically independent entity located at the core network 130 with connection to the multiple BSs 170. In other aspects of the present application, the SMF may be implemented as a logical entity co-located inside a BS 170 through logic carried out by the processor 260.

Figure 5:
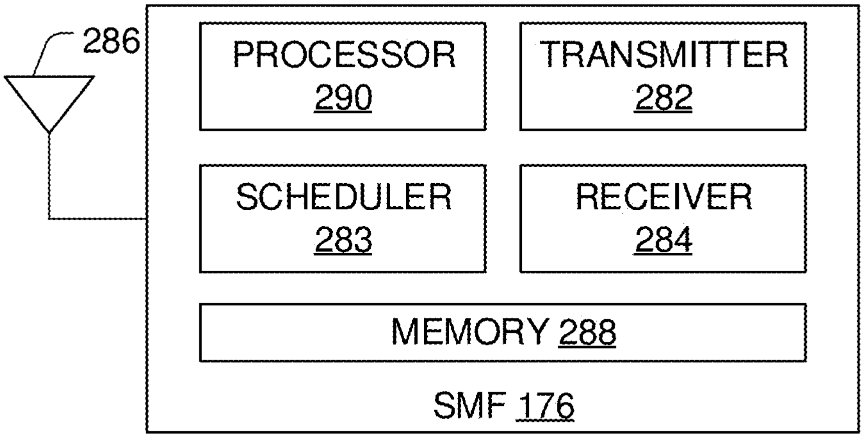
FIG. 5 illustrates, as a block diagram, a sensing management function, in accordance with aspects of the present application.

As shown in FIG. 5, an SMF 176, when implemented as a physically independent entity, includes at least one processor 290, at least one transmitter 282, at least one receiver 284, one or more antennas 286 and at least one memory 288. A transceiver, not shown, may be used instead of the transmitter 282 and the receiver 284. A scheduler 283 may be coupled to the processor 290. The scheduler 283 may be included within or operated separately from the SMF 176. The processor 290 implements various processing operations of the SMF 176, such as signal coding, data processing, power control, input/output processing or any other functionality. The processor 290 can also be configured to implement some or all of the functionality and/or embodiments described in more detail above. Each processor 290 includes any suitable processing or computing device configured to perform one or more operations. Each processor 290 could, for example, include a microprocessor, microcontroller, digital signal processor, field programmable gate array or application specific integrated circuit.

A reference signal-based pose determination technique belongs to an "active" pose estimation paradigm. In an active pose estimation paradigm, the enquirer of pose information (e.g., the UE 110) takes part in process of determining the pose of the enquirer. The enquirer may transmit or receive (or both) a signal specific to pose determination process. Positioning techniques based on a global navigation satellite system (GNSS) such as the known Global Positioning System (GPS) are other examples of the active pose estimation paradigm.

In contrast, a sensing technique, based on radar for example, may be considered as belonging to a "passive" pose determination paradigm. In a passive pose determination paradigm, the target is oblivious to the pose determination process.

By integrating sensing and communications in one system, the system need not operate according to only a single paradigm. Thus, the combination of sensing-based techniques and reference signal-based techniques can yield enhanced pose determination.

The enhanced pose determination may, for example, include obtaining UE channel sub-space information, which is particularly useful for UE channel reconstruction at the sensing node, especially for a beam-based operation and communication. The UE channel sub-space is a subset of the entire algebraic space, defined over the spatial domain, in which the entire channel from the TP to the UE lies. Accordingly, the UE channel sub-space defines the TP-to-UE channel with very high accuracy. The signals transmitted over other sub-spaces result in a negligible contribution to the UE channel. Knowledge of the UE channel sub-space helps to reduce the effort needed for channel measurement at the UE and channel reconstruction at the network-side. Therefore, the combination of sensing-based techniques and reference signal-based techniques may enable the UE channel reconstruction with much less overhead as compared to traditional methods. Sub-space information can also facilitate sub-space-based sensing to reduce sensing complexity and improve sensing accuracy.

In some embodiments of integrated sensing and communication, a same radio access technology (RAT) is used for sensing and communication. This avoids the need to multiplex two different RATs under one carrier spectrum, or necessitating two different carrier spectrums for the two different RATs.

In embodiments that integrate sensing and communication under one RAT, a first set of channels may be used to transmit a sensing signal and a second set of channels may be used to transmit a communications signal. In some embodiments, each channel in the first set of channels and each channel in the second set of channels is a logical channel, a transport channel or a physical channel.

At the physical layer, communication and sensing may be performed via separate physical channels. For example, a first physical downlink shared channel PDSCH-C is defined for data communication, while a second physical downlink shared channel PDSCH-S is defined for sensing. Similarly, separate physical uplink shared channels (PUSCH), PUSCH-C and PUSCH-S, could be defined for uplink communication and sensing.

In another example, the same PDSCH and PUSCH could be also used for both communication and sensing, with separate logical layer channels and/or transport layer channels defined for communication and sensing. Note also that control channel(s) and data channel(s) for sensing can have the same or different channel structure (format), occupy same or different frequency bands or bandwidth parts.

In a further example, a common physical downlink control channel (PDCCH) and a common physical uplink control channel (PUCCH) may be used to carry control information for both sensing and communication. Alternatively, separate physical layer control channels may be used to carry separate control information for communication and sensing. For example, PUCCH-S and PUCCH-C could be used for uplink control for sensing and communication respectively and PDCCH-S and PDCCH-C for downlink control for sensing and communication respectively.

Different combinations of shared and dedicated channels for sensing and communication, at each of the physical, transport, and logical layers, are possible.

The term RADAR originates from the phrase Radio Detection and Ranging; however, expressions with different forms of capitalization (e.g., Radar and radar) are equally valid and now more common. Radar is typically used for detecting a presence and a location of an object. A radar system radiates radio frequency energy and receives echoes of the energy reflected from one or more targets. The system determines the pose of a given target based on the echoes returned from the given target. The radiated energy can be in the form of an energy pulse or a continuous wave, which can be expressed or defined by a particular waveform. Examples of waveforms used in radar include frequency modulated continuous wave (FMCW) and ultra-wideband (UWB) waveforms.

Radar systems can be monostatic, bi-static or multi-static. In a monostatic radar system, the radar signal transmitter and receiver are co-located, such as being integrated in a transceiver. In a bi-static radar system, the transmitter and receiver are spatially separated, and the distance of separation is comparable to, or larger than, the expected target distance (often referred to as the range). In a multi-static radar system, two or more radar components are spatially diverse but with a shared area of coverage. A multi-static radar is also referred to as a multisite or netted radar.

Terrestrial radar applications encounter challenges such as multipath propagation and shadowing impairments. Another challenge is the problem of identifiability because terrestrial targets have similar physical attributes. Integrating sensing into a communication system is likely to suffer from these same challenges, and more.

Communication nodes can be either half-duplex or full-duplex. A half-duplex node cannot both transmit and receive using the same physical resources (time, frequency, etc.); conversely, a full-duplex node can transmit and receive using the same physical resources. Existing commercial wireless communications networks are all half-duplex. Even if full-duplex communications networks become practical in the future, it is expected that at least some of the nodes in the network will still be half-duplex nodes because half-duplex devices are less complex, and have lower cost and lower power consumption. In particular, full-duplex implementation is more challenging at higher frequencies (e.g., in millimeter wave bands) and very challenging for small and low-cost devices, such as femtocell base stations and UEs.

The limitation of half-duplex nodes in the communications network presents further challenges toward integrating sensing and communications into the devices and systems of the communications network. For example, both half-duplex and full-duplex nodes can perform bi-static or multi-static sensing, but monostatic sensing typically requires the sensing node have full-duplex capability. A half-duplex node may perform monostatic sensing with certain limitations, such as in a pulsed radar with a specific duty cycle and ranging capability.

Properties of a sensing signal, or a signal used for both sensing and communication, include the I a of the signal and the frame structure of the signal. The frame structure defines the time-domain boundaries of the signal. The waveform describes the shape of the signal as a function of time and frequency. A non-exhaustive list of examples of waveforms that can be used for a sensing signal includes ultra-wide band (UWB) pulse, Frequency-Modulated Continuous Wave (FMCW) or "chirp", orthogonal frequency-division multiplexing (OFDM), cyclic prefix (CP)-OFDM, and Discrete Fourier Transform spread (DFT-s)-OFDM.

In an embodiment, the sensing signal is a linear chirp signal with bandwidth B and time duration T. Such a linear chirp signal is generally known from its use in FMCW radar systems. A linear chirp signal is defined by an increase in frequency from an initial frequency, $f_{chirp0}$, at an initial time, $t_{chirp0}$, to a final frequency, $f_{chirp1}$, at a final time, $t_{chirp1}$ where the relation between the frequency (f) and time (t) can be expressed as a linear relation of $f-f_{chirp0}=\alpha(t-t_{chirp0})$, where $$\alpha = \frac{f_{chirp1} - f_{chirp0}}{t_{chirp1} - t_{chirp0}}$$

is defined as the chirp slope. The bandwidth of the linear chirp signal may be defined as $B=f_{chirp1}-f_{chirp0}$ and the time duration of the linear chirp signal may be defined as $T=t_{chirp1}-t_{chirp0}$. Such linear chirp signal can be presented as $e^{j\pi\alpha t^2}$ in the baseband representation.

Precoding, as used herein, may refer to any coding operation(s) or modulation(s) that transform an input signal into an output signal. Precoding may be performed in different domains and typically transforms the input signal in a first domain to an output signal in a second domain. Precoding may include linear operations.

A terrestrial communication system may also be referred to as a land-based or ground-based communication system, although a terrestrial communication system can also, or instead, be implemented on or in water. The non-terrestrial communication system may bridge coverage gaps in underserved areas by extending the coverage of cellular networks through the use of non-terrestrial nodes, which will be key to establishing global, seamless coverage and providing mobile broadband services to unserved/underserved regions. In the current case, it is hardly possible to implement terrestrial access-points/base-stations infrastructure in areas like oceans, mountains, forests, or other remote areas.

The terrestrial communication system may be a wireless communications system using 5G technology and/or later generation wireless technology (e.g., 6G or later). In some examples, the terrestrial communication system may also accommodate some legacy wireless technologies (e.g., 3G or 4G wireless technology). The non-terrestrial communication system may be a communications system using satellite constellations, like conventional Geo-Stationary Orbit (GEO) satellites, which utilize broadcast public/popular contents to a local server. The non-terrestrial communication system may be a communications system using low earth orbit (LEO) satellites, which are known to establish a better balance between large coverage area and propagation path-loss/delay. The non-terrestrial communication system may be a communications system using stabilized satellites in very low earth orbits (VLEO) technologies, thereby substantially reducing the costs for launching satellites to lower orbits. The non-terrestrial communication system may be a communications system using high altitude platforms (HAPs), which are known to provide a low path-loss air interface for the users with limited power budget. The non-terrestrial communication system may be a communications system using Unmanned Aerial Vehicles (UAVs) (or unmanned aerial system, "UAS") achieving a dense deployment, since their coverage can be limited to a local area, such as airborne, balloon, quadcopter, drones, etc. In some examples, GEO satellites, LEO satellites, UAVs, HAPs and VLEOs may be horizontal and two-dimensional. In some examples, UAVs, HAPs and VLEOs may be coupled to integrate satellite communications to cellular networks. Emerging 3D vertical networks consist of many moving (other than geostationary satellites) and high altitude access points such as UAVs, HAPs and VLEOs.

MIMO technology allows an antenna array of multiple antennas to perform signal transmissions and receptions to meet high transmission rate requirements. The ED 110 and the T-TRP 170 and/or the NT-TRP may use MIMO to communicate using wireless resource blocks. MIMO utilizes multiple antennas at the transmitter to transmit wireless resource blocks over parallel wireless signals. It follows that multiple antennas may be utilized at the receiver. MIMO may beamform parallel wireless signals for reliable multipath transmission of a wireless resource block. MIMO may bond parallel wireless signals that transport different data to increase the data rate of the wireless resource block.

In recent years, a MIMO (large-scale MIMO) wireless communication system with the T-TRP 170 and/or the NT-TRP 172 configured with a large number of antennas has gained wide attention from academia and industry. In the large-scale MIMO system, the T-TRP 170, and/or the NT-TRP 172, is generally configured with more than ten antenna units (see antennas 256 and antennas 280 in FIG. 3). The T-TRP 170, and/or the NT-TRP 172, is generally operable to serve dozens (such as 40) of EDs 110. A large number of antenna units of the T-TRP 170 and the NT-TRP 172 can greatly increase the degree of spatial freedom of wireless communication, greatly improve the transmission rate, spectrum efficiency and power efficiency, and, to a large extent, reduce interference between cells. The increase of the number of antennas allows for each antenna unit to be made in a smaller size with a lower cost. Using the degree of spatial freedom provided by the large-scale antenna units, the T-TRP 170 and the NT-TRP 172 of each cell can communicate with many EDs 110 in the cell on the same time-frequency resource at the same time, thus greatly increasing the spectrum efficiency. A large number of antenna units of the T-TRP 170 and/or the NT-TRP 172 also enable each user to have better spatial directivity for uplink and downlink transmission, so that the transmitting power of the T-TRP 170 and/or the NT-TRP 172 and an ED 110 is reduced and the power efficiency is correspondingly increased. When the antenna number of the T-TRP 170 and/or the NT-TRP 172 is sufficiently large, random channels between each ED 110 and the T-TRP 170 and/or the NT-TRP 172 can approach orthogonality such that interference between cells and users and the effect of noise can be reduced. The plurality of advantages described hereinbefore enable large-scale MIMO to have a magnificent application prospect.

A MIMO system may include a receiver connected to a receive (Rx) antenna, a transmitter connected to transmit (Tx) antenna and a signal processor connected to the transmitter and the receiver. Each of the Rx antenna and the Tx antenna may include a plurality of antennas. For instance, the Rx antenna may have a uniform linear array (ULA) antenna, in which the plurality of antennas are arranged in line at even intervals. When a radio frequency (RF) signal is transmitted through the Tx antenna, the Rx antenna may receive a signal reflected and returned from a forward target.

A non-exhaustive list of possible unit or possible configurable parameters or in some embodiments of a MIMO system include: a panel; and a beam.

A panel is a unit of an antenna group, or antenna array, or antenna sub-array, which unit can control a Tx beam or a Rx beam independently.

A beam may be formed by performing amplitude and/or phase weighting on data transmitted or received by at least one antenna port. A beam may be formed by using another method, for example, adjusting a related parameter of an antenna unit. The beam may include a Tx beam and/or a Rx beam. The transmit beam indicates distribution of signal strength formed in different directions in space after a signal is transmitted through an antenna. The receive beam indicates distribution of signal strength that is of a wireless signal received from an antenna and that is in different directions in space. Beam information may include a beam identifier, or an antenna port(s) identifier, or a channel state information reference signal (CSI-RS) resource identifier, or a SSB resource identifier, or a sounding reference signal (SRS) resource identifier, or other reference signal resource identifier.

In overview, in contrast to known approaches, aspects of the present application may be shown to exploit sensing information, an RF map of the communication environment and coarse UE position information. Through such exploitation, aspects of the present application may be shown to geometrically extract the physical characteristics of a UE channel and thereby enable estimation of dominant parameters for the UE channel. The dominant parameter estimation may be shown to be made possible by extracting main objects of the environment. The main objects of the environment may be considered to be objects that are associated with high radio frequency reflection coefficient, such as buildings and cars, for but two examples. The main objects of the environment may be shown to contribute reflections of a transmitted signal to a certain position.

The main objects of the environment may be converted to dominant channel components by exploiting a concept of virtual transmission points (VTPs) and a geometric channel model. Hence, the parameter estimation problem may be reduced to merely a challenge of identifying visibility of VTPs at a certain UE location.

Aspects of the present application relate to exploiting environment sensing information to reconstruct UE channel/channel subspaces along a UE movement path.

In contrast to current channel subspace estimation and tracking techniques, aspects of the present application relate to exploiting coarse UE position information in combination with an RF map of the environment to geometrically obtain arrival angular information and departure angular information of dominant channel components. Dominant channel components may be defined as the components with a power greater than a pre-defined/pre-configured threshold. Channel subspaces are considered to be constructed of the dominant channel components. Moreover, aspects of the present application relate to utilizing environment sensing information to update information about main reflectors. In particular, the information about a main reflector may include a shape for the main reflector, a position for the main reflector, an orientation of the main reflectors, a roughness of the main reflector, a reflection coefficient for the main reflector and a velocity of the main reflector. Notably, the “roughness” of a reflector may be considered to be an indicator of how much the surface of the reflector is able to reflect vs. scatter incoming RF signals. The roughness may relate to an indication of a degree of accuracy available for the position, of the VTP, obtained as compared to a pure refection assumption. Aspects of the present application relate to utilizing environment sensing information to build two lists or two look up tables of VTPs locations and movement directions.

Furthermore, aspects of the present application relate to proactively filtering out the look up tables of the VTPs to, thereby, identify visible VTPs for a given UE position or a predicted UE position. Such identification of visible VTPs may allow for changes of dominant angles of departures and arrivals to be estimated and tracked for a given UE 110. That is the channel subspace of the given UE 110 may be estimated and tracked.

Aspects of the present application may be understood to relate to two main stages, an initial environment sensing stage and a dominant reflectors identification and signaling stage. Notably, the dominant reflectors identification and signaling stage may be carried out offline and/or online.

In the initial environment sensing stage, a TRP 170 may transmit sensing reference signals (SeRS) to commence an effort to obtain a plurality of measurements of an environment. The environment may be considered to include a plurality of potential static reflectors and a plurality of potential moving reflectors. The measurements may allow the TRP 170 to record respective locations for the plurality of potential static reflectors. The measurements may allow the TRP 170 to record respective velocity vectors (speed and direction of movement) for the plurality of potential moving reflectors. The measurements may allow the TRP 170 to record respective reflection coefficients for the plurality of potential static reflectors and for the plurality of potential moving reflectors. The measurements may allow the TRP 170 to obtain a set of locations for potential virtual transmission points (VTPs, also known as mirror TPs, mTPs). The measurements may also allow the TRP 170 to classify each potential virtual transmission point as either a static VTP or a moving VTP.

A detailed procedure for carrying out the initial environment sensing stage may be found disclosed in Patent Cooperation Treaty (PCT) application no. PCT/CN2021/119471, which application is, hereby, incorporated herein by reference.

In contrast to the previously disclosed procedure for carrying out the initial environment sensing stage, in the present application, the TRP 170 is permitted to differentiate between static objects and moving objects and to obtain more information about the moving objects than is obtained about the static objects.

In the dominant reflectors identification and signaling stage, the TRP 170 performs VTP trimming and filtering on the VTPs list, obtained in the initial environment sensing stage. The VTP trimming and filtering may be both geometry-based and power-based. The goal of the VTP trimming and filtering may be considered to be to identify reflectors that are both dominant and visible and to, thereby, obtain information about channel subspaces for a given UE 110. Depending on the availability of position information for the UE 110, the TRP 170 may either provide offline VTPs trimming or provide online trimming and signaling.

In the case of having no position information for the UE 110 at the TRP 170 (or only coarse position information), e.g., a UE 110 recently connected to the TRP 170, the TRP 170 may perform offline VTP trimming. The offline VTP trimming may be based on pre-determined division of the communication environment into smaller "regions." The regions may also be referenced as "cells." The offline VTP trimming may include constructing VTP look up tables (LUTs). The VTP LUTs may be understood to contain a table entry for each VTP among a plurality of visible VTPs (called a "visible VTP set" and including moving VTPs and static VTPs) in each region, for a plurality of regions. Thus, the LUT associates a region to a list of visible VTPs, and different regions may be associated with different lists of visible VTPs. By knowing in which region a UE is located, the associations defined in the LUT can tell the TRP and the UE which VTPs are visible to the UE, and consequently, which reflectors will reflect a signal transmitted from the TRP to the UE.

Optionally, in the case of having relatively finer position information for the UE 110 at the TRP 170, the TRP 170 may perform online VTPs trimming. The online VTPs trimming may be based on the information about the position of the UE 110. The TRP 170 may obtain information for each VTP among a plurality of visible VTPs (called a "visible VTP set") for the particular position of the UE 110.

In both cases, the UE 110 may use a visible VTP set to obtain a set of dominant AoAs, the TRP 170 may use a visible VTP set to obtain a set of dominant AoDs and the TRP 170 may use the visible VTP set to obtain the AoAs associated with the AoDs.

Figure 6:
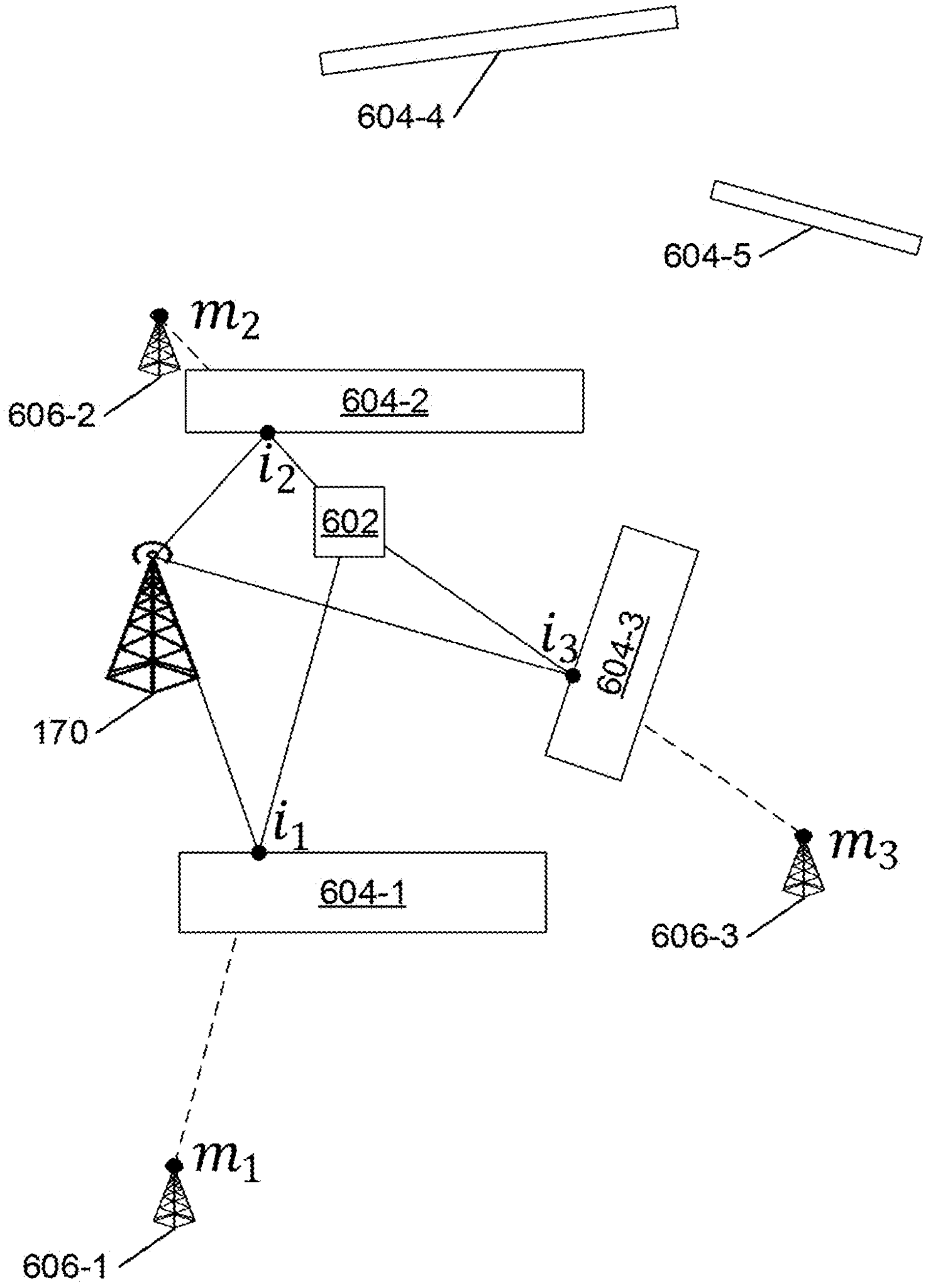
FIG. 6 illustrates an environment, including a region and a TRP.

FIG. 6 illustrates an environment 600, including a region 602 and a TRP 170. The environment 600 also includes a plurality of reflectors: a first reflector 604-1; a second reflector 604-2; a third reflector 604-3; a fourth reflector 604-4; and a fifth reflector 604-5 (individually or collectively, 604). It is readily understood that a signal from the TRP 170 may reach a UE (not shown) in the region 602 directly. It may also be understood that a signal from the TRP 170 may reach the UE in the region 602 after experiencing a reflection by a reflector 604. The reflection by a reflector 604 may cause the UE to perceive that the location of the TRP 170 is not the actual location of the TRP 170 but is, instead a location in the direction from which the signal was received. This perceived location gives rise to the VTPs discussed in the present application.

For a first example, the UE in the region 602 may be understood to perceive a signal received after a reflection by the first reflector 604-1 as having been transmitted by a first VTP 606-1. For a second example, the UE in the region 602 may be understood to perceive a signal received after a reflection by the second reflector 604-2 as having been transmitted by a second VTP 606-2. For a third example, the UE in the region 602 may be understood to perceive a signal received after a reflection by the third reflector 604-3 as having been transmitted by a third VTP 606-3.

Aspects of the present application relate to signaling schemes.

In one signaling scheme, the TRP 170 may transmit, to the UE 110, an indication of the visible VTPs LUTs for all regions. In another signaling scheme, the TRP 170 may transmit, to the UE 110, an indication of the visible VTPs LUTs for some of the regions. In a further signaling scheme, the TRP 170 may transmit, to the UE 110, indications of visible VTPs that only reference VTPs that are visible to the UE 110 based on UE location information.

Aspects of the present application relate to reconstructing channel subspaces for a UE 110 that has recently been associated with a TRP 170, where there is no prior information, available to the TRP 170, about the location of the UE 110 within a communication environment. Aspects of the present application relate to methods for building databases of locations of visible VTPs and reconstructing dominant AoAs and dominant AoDs according to the locations of the visible VTPs. Further aspects of the present application relate to methods for signaling, to the UE 110, the location databases and updates to the location databases and receiving feedback from the UE 110.

Given that the location of the UE 110 is not available at the TRP 170, the TRP 170 may start by dividing the communication environment into smaller regions. The TRP 170 may then provide the UE 110 with LUTs of the visible VTPs for each of the regions. Each visible VTP may be indexed, in the LUTs, by the location of the visible VTP.

On one hand, based on the UE 110 self-determining a position within the communication environment and responsive to the information included in the received LUTs, the UE 110 may select sets of visible VTPs. Upon selecting visible VTPs sets, the UE 110 may determine dominant AoAs.

On the other hand, the TRP 170 may receive feedback from the UE 110. The feedback may include an index to the region in which the UE 110 is located. The TRP 170 may then identify a set of VTPs visible to the UE 110. Upon identifying visible VTPs sets, the TRP 170 may determine dominant AoDs and AoAs.

The TRP 170 may perform an initial sensing procedure to obtain various information about each reflector 604. The information may include a location of each reflector 604, various dimensions of each reflector 604, an indication of reflectivity for each reflector 604, roughness of each reflector, an orientation of each reflector 604 and a velocity vector for each reflector 604. As mentioned hereinbefore, the initial sensing procedure may be performed according to methods disclosed in PCT application no. PCT/CN2021/119471. Moreover, the TRP 170 may group main reflectors 604 into fixed groups and moving groups. So-called main reflectors 604 may be identified based on having significant reflected power from the perspective of the region 602. A threshold for "significant" may be determined experimentally. For moving reflectors 604, the TRP 170 may perform a dedicated sensing procedure for tracking the changes in the respective velocity vectors (representative of both movement direction and speed) of the moving reflectors 604. Based on a pre-determined division of the communication environment of the TRP 170 into regions, the TRP 170 may determine a set of the VTPs that are visible for each region. Each region may have a unique index, with the unique index being provided, in advanced, to the UE 110 and to the TRP 170. Despite the reference, hereinbefore, to four corner points, it is understood that a given region may have a triangular shape, a hexagonal shape or another shape. Moreover, a non-uniform division of the communication environment may be adopted for those cases wherein the size of the regions may be allowed to vary for different deployments. Notably, the size and shape of the regions may be adjusted based on the size and shape of various reflectors 604 in the communication environment. In some aspects of the present application, a complicated reflector shape may be approximated with one or more simple shapes to, thereby, facilitate the VTP determination process. The approximation may be taken into account by associating an ambiguity measure with the VTP location.

Figure 7A:
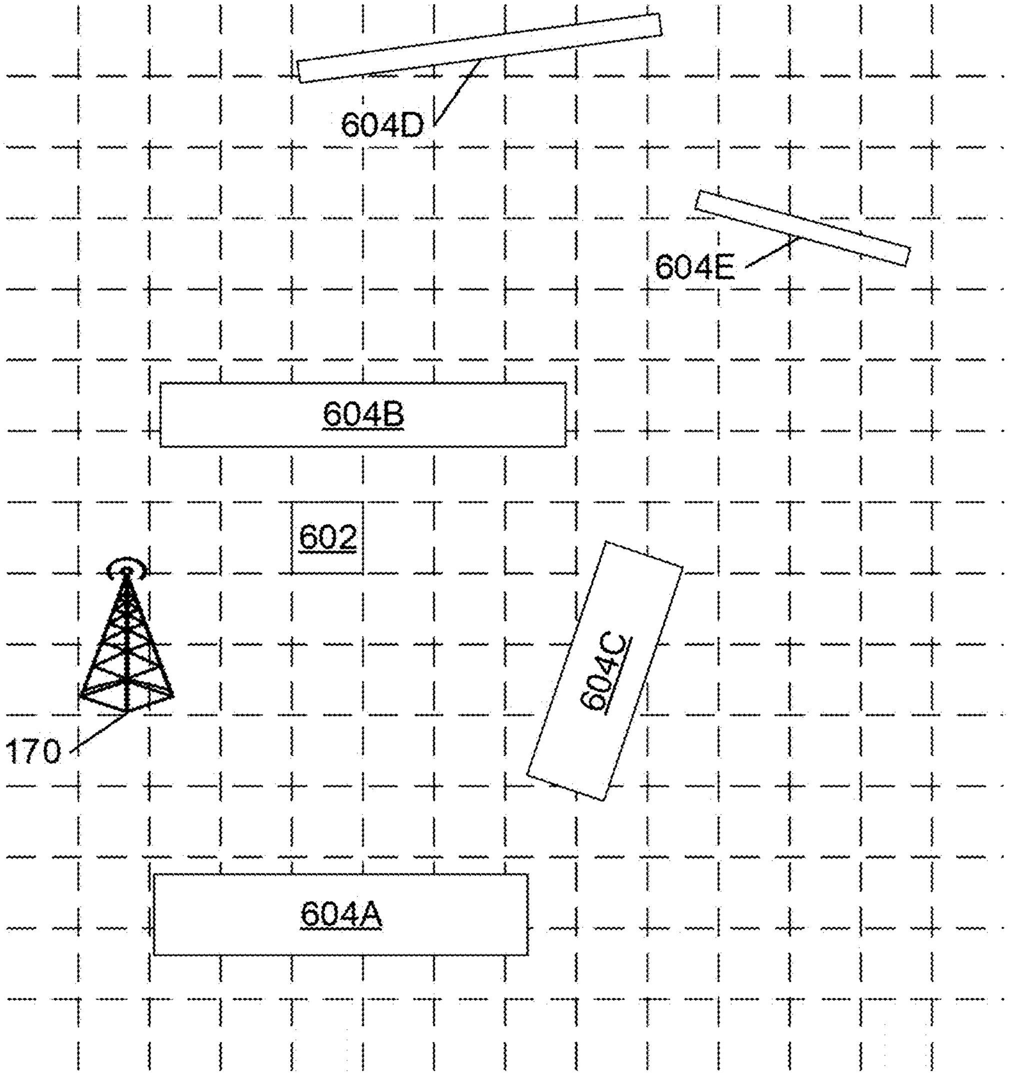
FIG. 7A illustrates the environment of FIG. 6 with additional division lines, thereby providing context for the region.
Figure 7B:
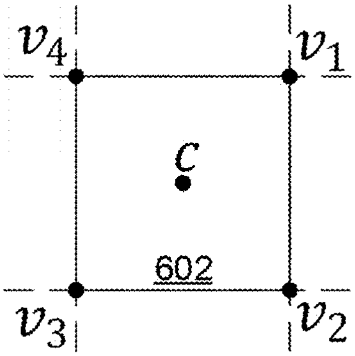
FIG. 7B illustrates the region of FIG. 6 and FIG. 7A with a center and four corner points.

FIG. 7A illustrates the environment 600 of FIG. 6 with additional division lines, thereby providing context for the region 602. FIG. 7B illustrates the region 602 with a center, c, and four corner points, $\{v_1, v_2, v_3, v_4\}$.

The TRP 170 may determine the visible VTPs for a given region through two main steps.

In the first main step, the TRP 170 may initiate a search for VTPs to add to a visible VTP list. The TRP 170 may limit the search so that the only VTPs that may be added to the visible VTP list are those VTPs that can provide sufficient power to the given region, wherein "sufficient" power may be defined by a predetermined threshold. A given VTP may be considered to be able to provide sufficient power to the given region on the basis of awareness of the power to be transmitted at the TRP 170 and on the basis of predicting a power loss due to a traveling distance between the location of the given VTP and the location of the region, represented by $\{c, v_1, v_2, v_3, v_4\}$. The first main step may be referenced as power-based trimming.

In the second main step, the TRP 170 may consider a geometric feasibility of a path between the given VTP and each of the five points, $\{c, v_1, v_2, v_3, v_4\}$, that represent the location of the region. The TRP 170 may establish a visible VTP short list for each region as the union of all of the visible VTPs for the points, $\{c, v_1, v_2, v_3, v_4\}$, that represent the location of the region. For a given VTP in the visible VTP short list, the TRP 170 may determine whether the given VTP is visible geometrically to the points, $\{c, v_1, v_2, v_3, v_4\}$, that represent the location of the region. The second main step may be referenced as geometry-based trimming.

While offline, the TRP 170 may predetermine, for a given region, a visible VTP set associated with the static reflectors 604 in an environment and, while on-line, the TRP 170 may dynamically determine, for the given region, a visible VTP set associated with the moving reflectors 604. In each case, the TRP 170 may save the visible VTP set in a LUT (or database), with each visible VTP set associated with an index that identifies the given region.

The LUT (or database) may also include an indication of a reflectivity coefficient for each reflector 604 associated with an VTP 606. The LUT may also include an indication of the surface roughness for each reflector 604 associated with a VTP 606. The LUT (or database) may also include an indication of a path loss model, such as a path loss exponent model, etc., to, thereby, allow the TRP 170 to estimate power loss over a path associated with a VTP 606. According to the availability and accuracy of position information for a given UE 110, the TRP 170 may signal an entire LUT (database) or only part of the LUT (database) to the given UE 110. The TRP 170 may frequently update the LUT (database) by updating the list of VTPs associated with moving reflectors for each region. The TRP 170, upon updating the LUT (database), may signal, to the given UE 110, an indication of changes made to the LUT (database).

Signaling from the TRP 170 to the UE 110 may allow the TRP 170 to provide, to the UE 110, the visible VTPs LUT (database). Signaling from the TRP 170 to the UE 110 may be arranged to employ static/semi static and dynamic signaling. On the one hand, the static/semi static signaling may be used to transmit the visible VTP LUT (or a portion thereof) to the UE 110 through higher layer signaling, such as RRC signaling or using a MAC control element (MAC-CE). The static/semi static signaling can be embedded in a master information block (MIB) or a system information block (SIB) included in a SSB transmission in an initial access phase. In some aspects of the present application, when beamforming a particular beam to be used for SSB transmission, only a portion of the LUT, including a VTP list corresponding to each beam, is transmitted over the particular beam. On the other hand, the dynamic signaling may be used to allow the TRP 170 to provide, to the UE 110, indications of updates made to the LUTs. The updates may be provided by transmitting, using layer 1 (Li) signaling (e.g., through downlink control information, DCI), only the changes made to a visible VTP LUT. Optionally, the TRP 170 may transmit, to the UE 110, information that provides an indication of a degree of uncertainty or a degree of reliability to associate with each of the visible VTPs that have been determined to be worthy on including in the visible VTP LUT.

As discussed hereinbefore, the TRP 170 may receive, from the UE 110 through Li dynamic signaling, feedback including an index to the region in which the UE 110 is located. The feedback may be used, by the TRP 170, to update a record, maintained at the TRP 170, of a location of the UE 110. The location may be expressed as index to the region in which the UE 110 is located. Optionally, the UE 110 may obtain some measurements. The UE 110 may compare, fuse and merge the measurements with the estimated AoAs to check the reliability of the received information.

Given a list of the VTP locations, the planes of reflectors and the location of the TRP 170 in the communication area, the visible VTPs set of each region is calculated based on performing three simple checks for each corner point of the given region.

Given the center point, c, of the given region 602, the TRP 170 may determine whether a line segment between a location, $m_l$, for the $l^{th}$ VTP 606-1 and a location of the center point, c, of the given region 602 intersects with a plane of the $l^{th}$ reflector 604-1 (associated with the $l^{th}$ VTP 606-1). Upon determining that there is an intersection, the TRP 170 may obtain a representation, $i_l$, of the intersection. Upon determining that there is no intersection, it follows that, from the perspective of the center point, c, of the given region 602, the $l^{th}$ reflector 604-1 does not provide a reflection of a signal transmitted by the TRP 170. It further follows that the $l^{th}$ VTP 606-1 is not to be listed among VTPs visible to the center point, c, of the given region 602.

The TRP 170 may determine whether the line segment between $i_l$ and c, called a "reflected path," intersects with any other plane. Upon determining that there is an intersection, then the reflected path may be considered to be obstructed. It follows that the $l^{th}$ VTP 606-1 may be declared to be invisible and is not to be listed among VTPs visible to the center point, c, of the given region 602.

Consider that the location of the TRP 170 may be referenced as "t." The TRP 170 may determine whether a line segment between t and c, called a "transmission path," intersects with any other planes. Upon determining that there is an intersection, then the transmission path may be considered to be obstructed. It follows that the TRP 170 may be declared to be invisible and is not to be listed among VTPs visible to the center point, c, of the given region 602.

These three steps can be repeated for the remainder of the five points, $\{c, v_1, v_2, v_3, v_4\}$, that represent the location of the region and for all of the VTPs 606. In this way, the visible VTPs set for the region 602 may be built. A similar procedure may be applied to so-called "two-bounce reflections" with a determination that employs rather involved calculations. Multiple reflections higher than the two-bounce reflections are less likely to occur over mmWave bands due to the significant power loss in reflections.

Notably, visibility regions for irregularly shaped reflectors 604 may be determined based on offline measurements and subsequently included in the look-up table that is specific to the static objects. Furthermore, other irregularly shaped reflectors can be approximated as a set of planes, with a VTP 606 associated with a plane, rather than being associated with an entire object 604.

Figure 8:
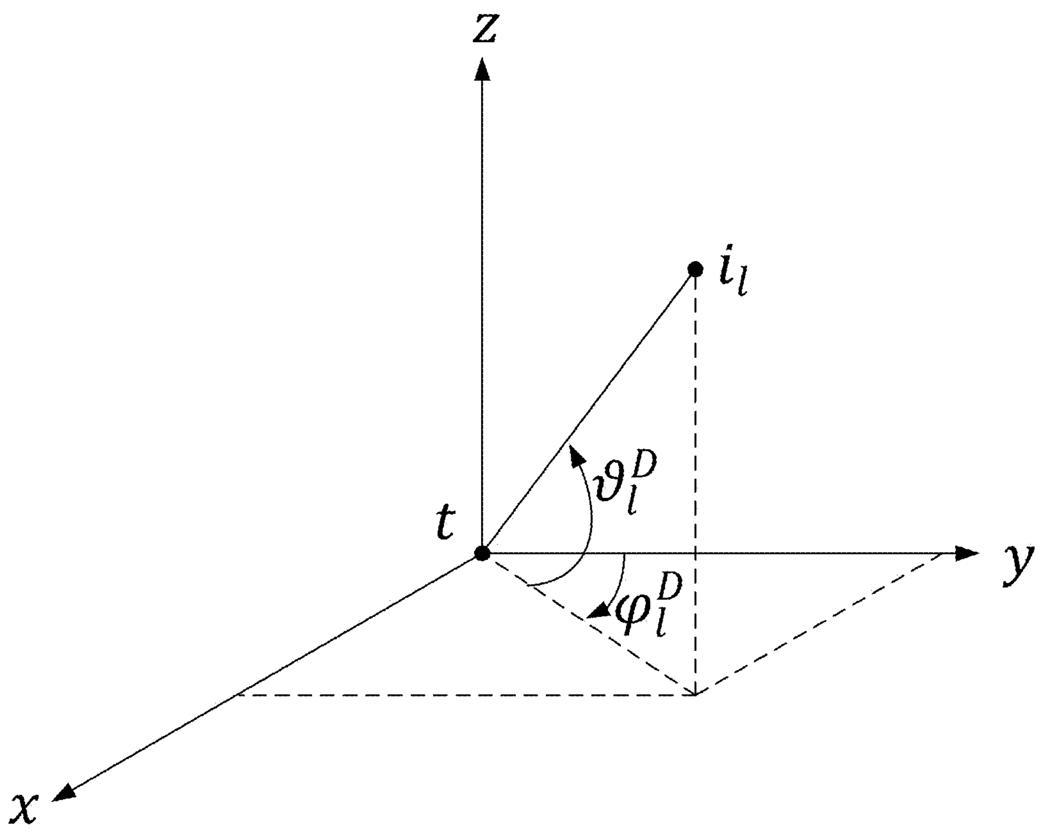
FIG. 8 illustrates a line segment representative of an angle of departure from the location of a transmission-reception point to an intersection point.

At the TRP 170, a primary concern is related to determining AoDs based on estimating the locations of the intersection points $\{i_1, i_2, \ldots, i_l, \ldots, i_L\}$, assuming that there are L visible reflectors. We note here that the intersection points $\{i_1, i_2, \ldots, i_L\}$ and the cardinality, L, of a visible VTP set may be obtained at the TRP 170. Therefore, there is no extra overhead or measurements for obtaining the intersection points or the cardinality. Given t and intersection points $\{i_1, i_2, \ldots, i_L\}$, AoDs may be determined, by the TRP 170, using $$\vartheta_l^D = \tan^{-1}\left(\frac{z_{i_l} - z_t}{\sqrt{(x_{i_l} - x_t)^2 + (y_{i_l} - y_t)^2}}\right), \tag{1}$$

$$\varphi_l^D = \tan^{-1}\left(\frac{x_{i_l} - x_t}{y_{i_l} - y_t}\right), \tag{2}$$

where $$\vartheta_l^D$$

is the $l^{th}$ elevation AoD and $$\varphi_l^D$$

is the $l^{th}$ azimuth AoD associated with the $l^{th}$ visible VTP. FIG. 8 illustrates a line segment representative of the $l^{th}$ AoD from the location, t, of the TRP 170 to the $l^{th}$ intersection point, $i_l$. More particularly, the line segment is illustrated with the $l^{th}$ elevation AoD, $$\vartheta_l^D,$$

and the $l^{th}$ azimuth AoD, $$\varphi_l^D.$$

At the UE 110, a primary concern is related to determining AoAs based on the received list of visible VTPs locations $\{m_1, m_2, \ldots, m_L\}$ and either the location, c, of the region in which the UE 110 is located or the location, u, of the UE 110. The list of visible VTP locations $\{m_1, m_2, \ldots, m_L\}$ and updates to the list are obtained from the "list of visible VTPs LUT signaling" as indicated hereinbefore. Given either c or u and $\{m_1, m_2, \ldots, m_L\}$, AoAs may be determined, by the UE 110, using $$\vartheta_l^A = \tan^{-1}\left(\frac{z_{m_l} - z_{c/u}}{\sqrt{(x_{m_l} - x_{c/u})^2 + (y_{m_l} - y_{c/u})^2}}\right) \text{ and} \tag{3}$$

-continued $$\varphi_l^A = \tan^{-1}\left(\frac{x_{m_l} - x_{c/u}}{y_{m_l} - y_{c/u}}\right). \tag{4}$$

Figure 9:
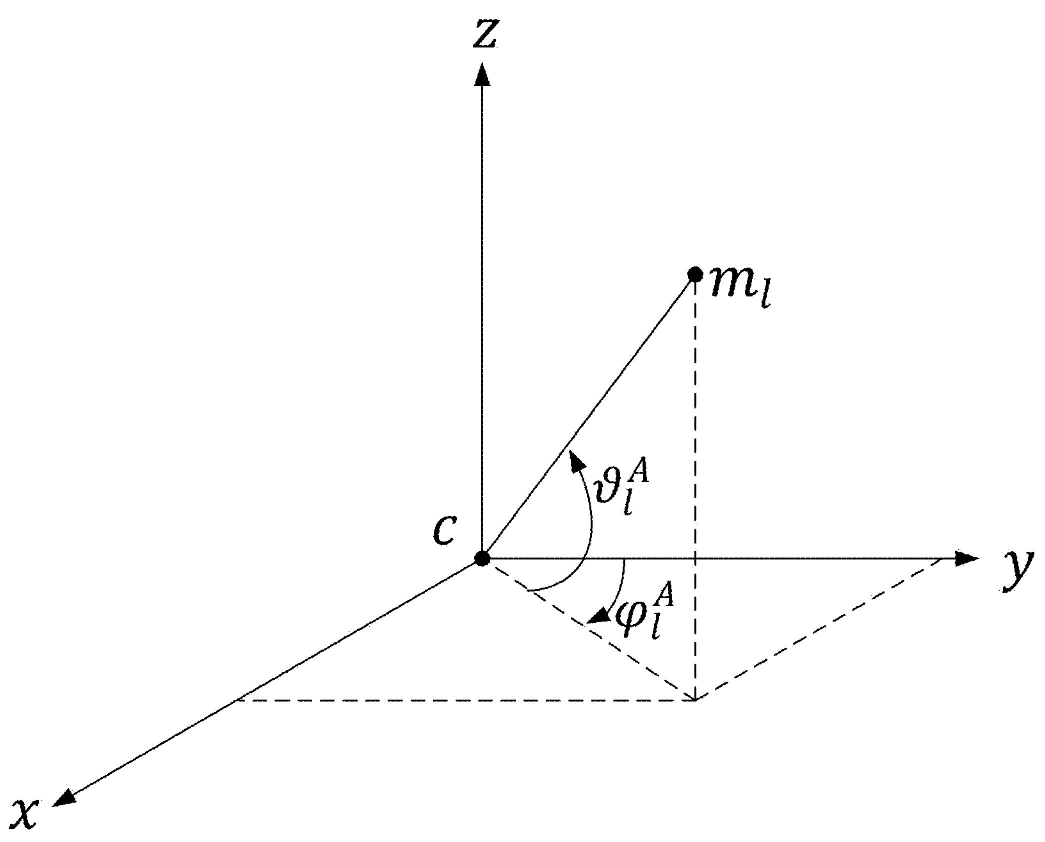
FIG. 9 illustrates a line segment representative of an angle of arrival from the location of a region to a visible virtual transmission point location.

FIG. 9 illustrates a line segment representative of the $l^{th}$ AoA from the location, c, of the region 602 to the $l^{th}$ visible VTP location, $m_l$. More particularly, the line segment is illustrated with the $l^{th}$ elevation AoA, $$\vartheta_l^A,$$

and the $l^{th}$ azimuth AoA, $$\varphi_l^A.$$

Both the TRP 170 and the UE 110 may determine the dominant AoDs and the dominant AoAs, respectively, by estimating the received power at either c or u for the $l^{th}$ channel path. The $l^{th}$ channel path may be represented by the tuple $$(\vartheta_l^D, \varphi_l^D, \vartheta_l^A, \varphi_l^A, m_l, c/u).$$

The received power may be estimated based on an estimated range, $r_l$, a reflection coefficient associated with the $l^{th}$ reflector and the path loss model. The range of the $l^{th}$ channel path associated with the tuple $$(\vartheta_l^D, \varphi_l^D, \vartheta_l^A, \varphi_l^A, m_l, c/u)$$

may be given by $$r_l = \sqrt{(x_{m_l} - x_{c/u})^2 + (y_{m_l} - y_{c/u})^2 + (z_{m_l} - z_{c/u})^2}. \tag{5}$$

The refection coefficient may be estimated during an initial sensing stage. In the initial sensing stage, the TRP 170 transmits SeRS and measures reflections of the SeRS from objects in the environment, as disclosed in PCT application no. PCT/CN2021/119471. As a result, the received power of the $l^{th}$ channel path may be determined as the transmitted power along the departure angles $$\vartheta_l^D, \varphi_l^D$$

after accounting for power losses due to the range, $r_l$, while taking into account the given path loss model and the reflection losses.

Figure 10:
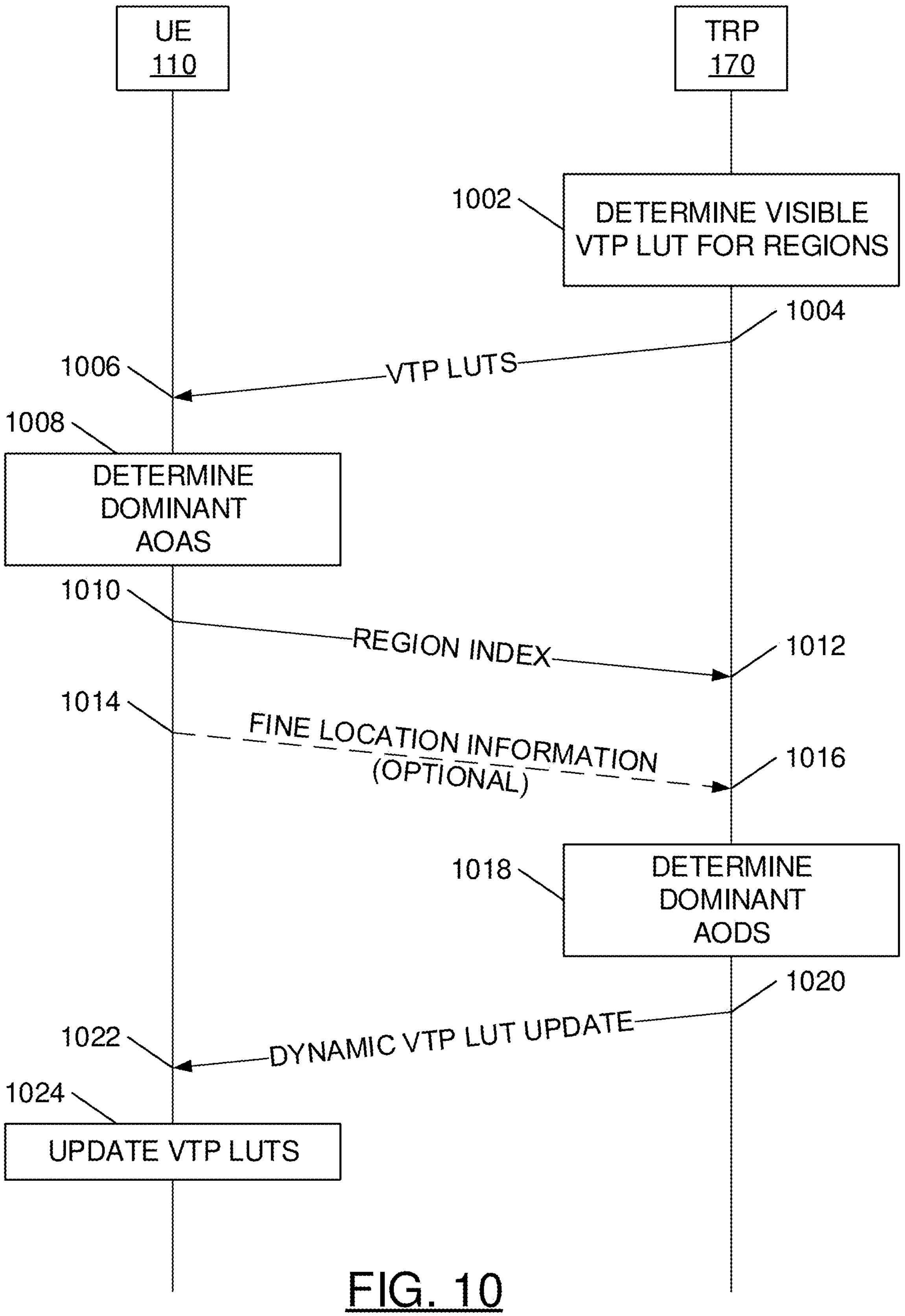
FIG. 10 illustrates, in a signal flow diagram, an example exchange between a transmission-reception point and a UE, in accordance with aspects of the present application.

FIG. 10 illustrates, in a signal flow diagram, an example exchange between a TRP 170 and a UE 110 for generating and updating the UE's VTP LUTs. As discussed hereinbefore, the TRP 170 may divide a communication environment into a plurality of regions. The TRP 170 may then determine (step 1002) a visible VTP LUT for each region in the plurality of regions, thereby creating a plurality of visible VTP LUTs. A LUT contains a list of VTPs, so each visible VTP LUT may be referred to generally as a list. The TRP 170 may transmit (step 1004), to the UE 110 using higher layer signaling, the plurality of visible VTP LUTs. Upon receiving (step 1006) the plurality of visible VTP LUTs, the UE 110 may determine (step 1008) a plurality of AoAs. More particularly, the UE 110 may determine (step 1008) a plurality of dominant AoAs. The UE 110 may determine (step 1008) the plurality of AoAs using equations (1) and (2), based on knowing the visible VTP list corresponding to its location region and its own location, presented hereinbefore. Among the plurality of dominant AoAs, the UE 110 may determine that there is one AoA that is dominant. Determination may include measurement of the signal strength by the UE 110 along with the plurality of AoAs and determine which one(s) are dominant.

The UE 110 may then transmit (step 1010), to the TRP 170 and using a beam direction corresponding to the one or more dominant AoA(s), an indication of the index of the region where the UE 110 is located. Optionally, the UE 110 may then transmit (step 1010), to the TRP 170, an indication of the location of the UE 110 that has a finer resolution than the resolution of the region.

Upon receiving (step 1012) indication of the index of the region where the UE 110 is located and, optionally, upon receiving (step 1016) the finer indication of the location of the UE 110, the TRP 170 may determine (step 1018) a plurality of AoDs. More particularly, the TRP 170 may determine (step 1018), using equation (5), a plurality of dominant AoDs. The TRP 170 may determine (step 1018) the plurality of AoDs using equations (3) and (4), presented hereinbefore.

Occasionally, the TRP 170 may transmit (step 1020), to the UE 110 using dynamic Li signaling, indications of updates made to the plurality of visible VTP LUTs that were initially provided in step 1004. Upon receipt (step 1022) of the indications of updates, the UE 110 may update (step 1024) the VTP LUTs stored locally.

The foregoing may be shown to provide solutions to the known channel subspaces reconstruction problem. Conveniently, aspects of the present application may be shown to render closed-form solutions that do not involve iterative processes or sophisticated algorithms. Additionally, aspects of the present application may be shown to save on measurement by UEs 110 and feedback signaling by UEs 110. Further, aspects of the present application may be shown to solve delays problem related to beam sweeping-based channel estimation and beam tracking. According to aspects of the present application, a beam search can be done in the vicinity of the obtained AoDs and AoAs, instead of exhaustively searching all directions. Moreover, in case of blockage in a dominant path, a beamformer can be steered toward a the AoD and AoA associated with a second strongest path instead of triggering beam sweeping procedures. Furthermore, aspects of the present application may be shown to reduce signaling and training overhead and power for estimating and tracking channel parameters. Finally, aspects of the present application may be shown to provide significant savings when the LUT signaling is compared to known approaches. This savings may be attributed to the VTP locations not changing rapidly responsive to changes in the position of the UE 110, thereby allowing for a reduction memory space used and a reduction in a frequency of signaling.

Aspects of the present application relate to reconstructing channel subspaces for an active UE 110 that has been in communication with the TRP 170 and where a prior information about a location of the 110 may be available at the TRP 170. Some of the following aspects of the present application relate to methods for signaling, to the UE 110, the visible VTPs locations set and updates to the visible VTPs locations set and receiving, from the UE 110, feedback.

Some of the following aspects of the present application are based upon an assumption that the TRP 170 maintains information regarding a location for the UE 110, i.e., u. As a result, given the whole set of VTPs for an environment, the TRP 170 may determine the visible VTP set, at u, by using the three steps discussed hereinbefore with a minor change of replacing c by u. Notably, that there is no need to grid the environment. Nor is there a need to build a LUT (database) of visible VTPs, since u is known to the TRP 170. Similarly, the TRP 170 and the UE 110 may obtain the AoDs and AoAs using the methods and equations discussed hereinbefore.

Figure 11:
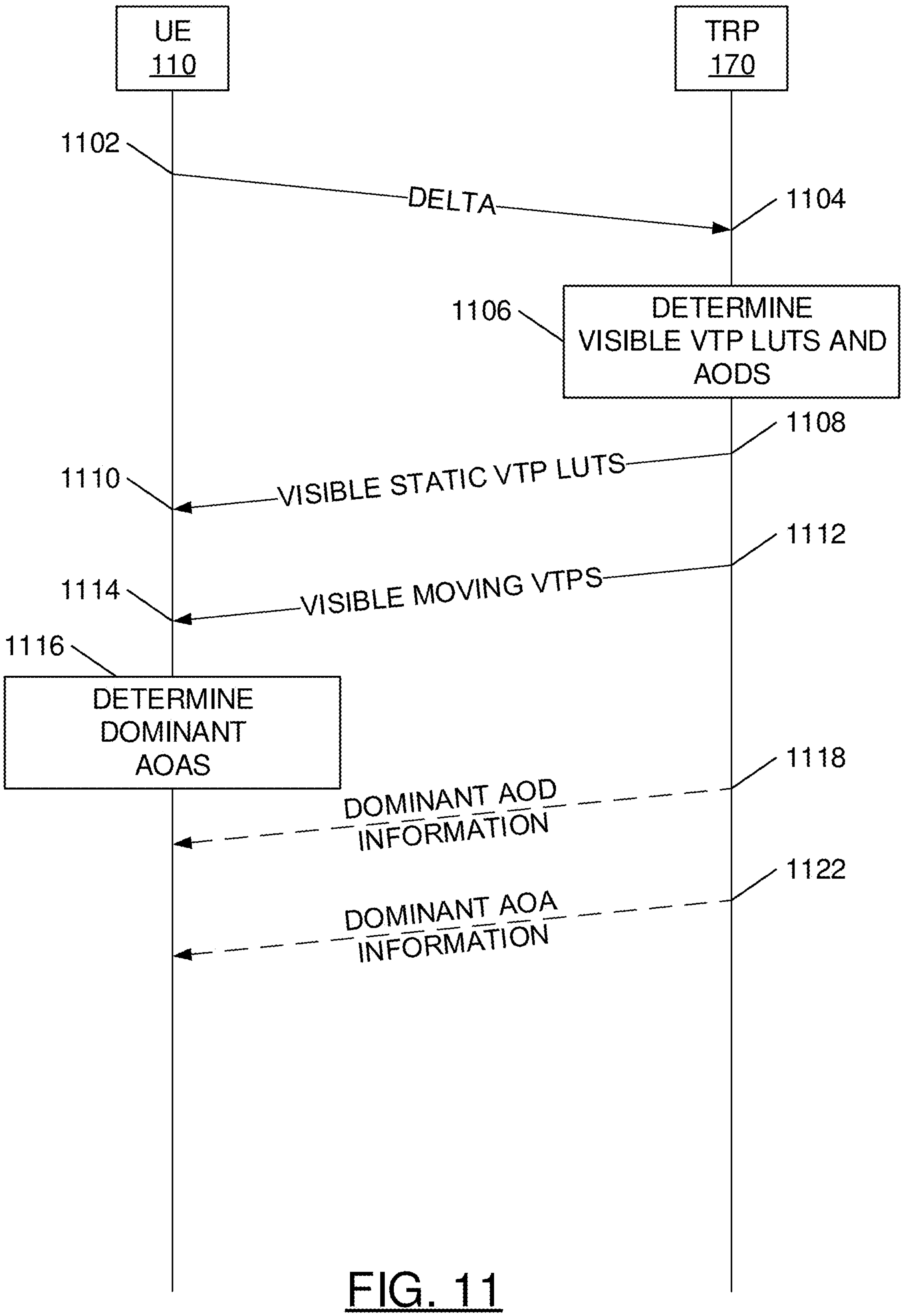
FIG. 11 illustrates, in a signal flow diagram, an example exchange, distinct from the exchange of FIG. 10, between a transmission-reception point and a UE, in accordance with aspects of the present application.

FIG. 11 illustrates, in a signal flow diagram, an example exchange between a TRP 170 and a UE 110 for separately updating the UE's static VTP LUT and list of moving VTPs. Aspects of the present application relate to a signaling scheme that starts with a UE 110 transmitting (step 1102), to the TRP 170, feedback. The feedback may include an indication of a location, u, for the UE 110 or a delta from a previous position in view of a velocity vector. The transmitting (step 1102) may employ dynamic Li signaling. The receiving (step 1104), from the UE 110, of the UE location information, may be shown to enable the TRP 170 to track changes of the location of the UE 110. In view of location information and a velocity vector, the TRP 170 may proactively determine (step 1106) a visible VTP set at a new location of the UE 110. It follows that subsequent signaling from the TRP 170 may include two sets of visible VTPs. The TRP 170 may transmit (step 1108) the set of static visible VTPs through a static/semi-static higher level signaling. The TRP 170 may transmit (step 1112) the set of moving visible VTPs, including their locations and velocity vector (speed and direction of movement) through a dynamic Li signaling.

Upon receiving (step 1110) the set of static visible VTPs and upon receiving (step 1112) the set of moving visible VTPs, the UE 110 may determine (step 1116) a plurality of AoAs and, in particular, the UE 110 may isolate the dominant AoAs.

Going forward, the TRP 170 may transmit (step 1118 and step 1122) only updates to, or changes in, the predicted VTP sets and the VTP sets currently in place at the UE 110. The update may be accomplished using binary flags for the existing VTP sets in addition to the values for new VTP sets. Optionally, the TRP 170 may transmit (step 1118) indications of a plurality of estimated AoDs along with an indication of a strength for dominant directions. The TRP 170 may also transmit (step 1122) indications of a plurality of estimated AoAs along with an indication of a strength for dominant directions. The TRP 170 may frequently update the UE 110 with changes (step 1118 and step 1122). Alternatively, the TRP 170 may transmit (step 1118 and step 1122), to the UE 110, the set of intersection points $\{i_1, i_2, \ldots, i_l\}$ associated with visible reflectors associated with VTPs, thereby allowing for estimating AoDs at the UE 110.

Figure 12:
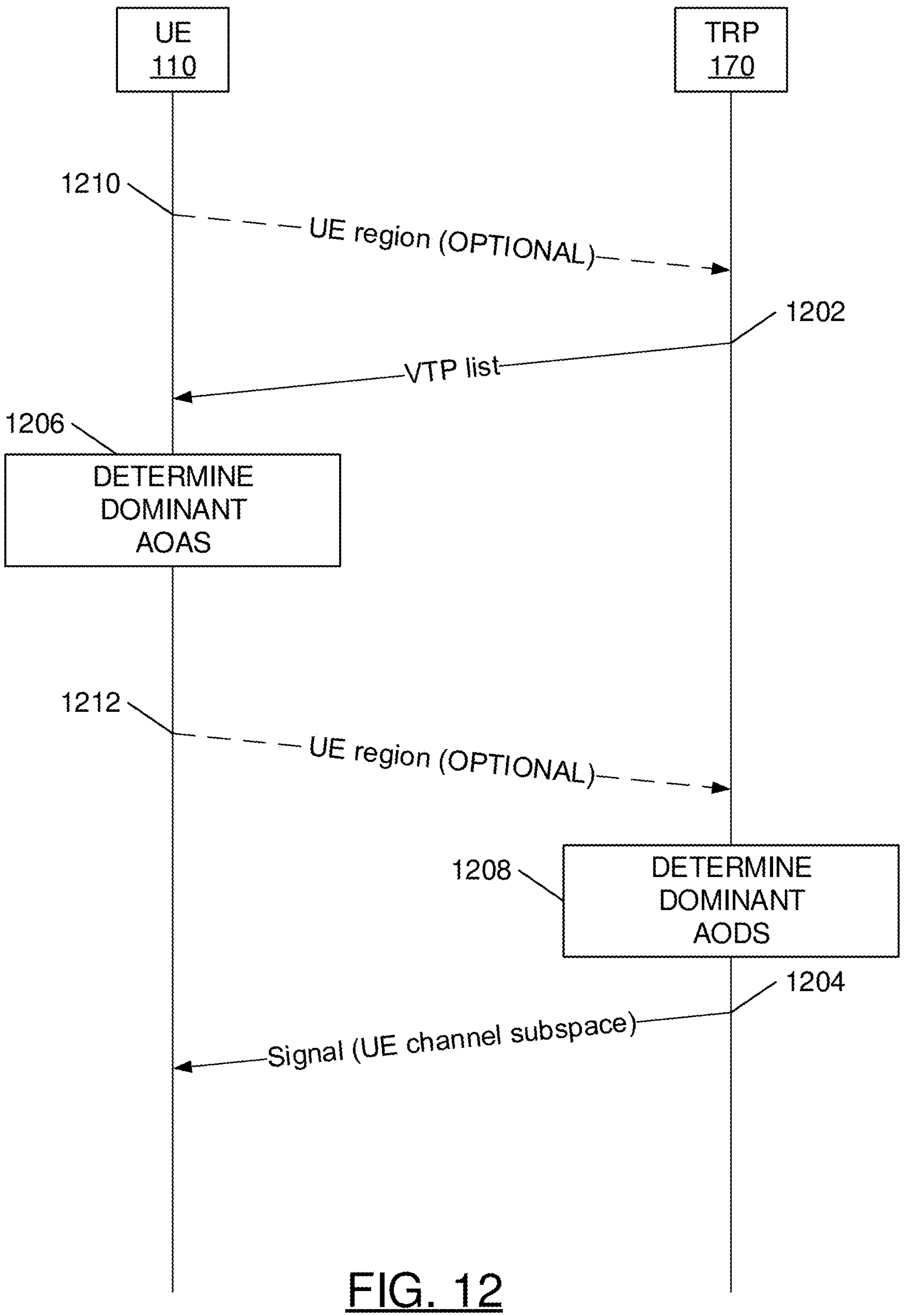
FIG. 12 illustrates, in a signal flow diagram, a more general example exchange between a transmission-reception point and a UE, in accordance with aspects of the present application.

FIG. 12 illustrates, in a signal flow diagram, an example exchange between a TRP 170 and a UE 110 for channel reconstruction and tracking of any of the previously-described embodiments. At 1202, the TRP transmits a list of VTPs to the UE. The list of VTPs may be an entire LUT that associates a plurality of regions to a plurality of lists of VTPs, or it may be one or more subset LUTs that associate some subset of regions to lists of VTPs, or it may be just a list of VTPs visible to locations in one region of the plurality of regions. The list of VTPs may be transmitted in an RRC signal, a MAC-CE, or a DCI, or in a combination thereof.

In any scenario, the transmitted list of VTPs belongs to a plurality of lists, and the transmitted list of VTPs comprises at least a VTP visible from a location in a first region of the plurality of regions of the wireless communication environment. Each region of plurality of regions corresponds to a respective one of the plurality of lists of VTPs. Moreover, for each region, a VTP in the list corresponding to that region is associated with a reflector in the wireless communication environment.

At 1204, the TRP transmits a signal to the UE based on information associated with the reflector; correspondingly, the UE receives the signal based on the information associated with the reflector. The information associated with the reflector may be, for example, a dominant AoD to the reflector at the TRP, or for another example, a dominant AoA from the reflector at the UE.

Knowledge of the region in which the UE is located, along with the list of VTPs corresponding to that region, enables the UE and TRP to preferably determine dominant AoAs (1206) and AoDs (1208), respectively, of reflections to and from a reflector associated with a VTP, for channel subspace reconstruction and tracking.

In addition to the first region of the plurality of regions, the LUT may also associate a second region to a different list of visible VTPs. If the UE moves to this second region, it can indicate this second region to the TRP so that the LUT can be used to determine a new dominant AoD. The TRP may also optionally also update the UE's LUT with an updated list of VTPs. This update can be transmitted, for example, by layer 1 signaling such as DCI. The updated list of VTPs could account for a reflector that has moved.

While knowledge of the UE's region may somehow be previously known to the TRP, the UE may optionally communicate its region to the TRP. By communicating the UE region to the TRP before a signal taking advantage of channel subspace reconstruction is transmitted, the TRP can transmit the signal using an AoD derived from the recently communicated region information. The communication of the region may be made before (1210) or after (1212) the transmission of the list of VTPs at 1202.

Aspects of the present application relate to methods for tracking and predicting the channel subspaces of a moving UE 110. Such tracking and predicting may be shown to enhance communication quality of services where, for example, channel parameters may be updated based on a new UE 110 location. It follows that beamformers at both ends of a communication channel may be updated.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:

transmitting, by a transmission-reception point, a list of virtual transmission points to a device in a wireless communication environment, the list of virtual transmission points belonging to a plurality of lists, the list of virtual transmission points comprising a virtual transmission point visible from a location in a first region of a plurality of regions of the wireless communication environment, the virtual transmission point being associated with a reflector in the wireless communication environment, and wherein each list of the plurality of lists corresponds to a respective region of the plurality of regions; and transmitting, by the transmission-reception point, a signal to the device, based on information associated with the reflector.

2. The method of claim 1, further comprising:

receiving from the device, by the transmission-reception point, an indication of a second region of the plurality of regions.

3. The method of claim 1, further comprising:

obtaining, by the transmission-reception point, an updated list of virtual transmission points; and transmitting, by the transmission-reception point, the updated list of virtual transmission points to the device.

4. The method of claim 1, further comprising:

prior to transmitting the signal, receiving, by the transmission-reception point, an indication of the first region from the device.

5. The method of claim 1, wherein the information associated with the reflector comprises one or more of: a plurality of angles of departure, a dominant angle of departure among the plurality of angles of departure, a shape of the reflector, a position of the reflector, an orientation of the reflector, a reflection coefficient of the reflector, a velocity of the reflector, or a velocity vector of the reflector.

6. A method comprising:

receiving, by a device in a wireless communication environment, a list of virtual transmission points from a transmission-reception point, the list of virtual transmission points belonging to a plurality of lists, the list of virtual transmission points comprising a virtual transmission point visible from a location in a first region of a plurality of regions of the wireless communication environment, the virtual transmission point being associated with a reflector in the wireless communication environment, and wherein each list of the plurality of lists corresponds to a respective region of the plurality of regions; and receiving, by the device, a signal from the transmission-reception point, based on information associated with the reflector.

7. The method of claim 6, further comprising:

transmitting to the transmission-reception point, by the device, an indication of a second region of the plurality of regions.

8. The method of claim 6, further comprising:

receiving from the transmission-reception point, by the device, an updated list of virtual transmission points.

9. The method of claim 6, further comprising:

prior to receiving the signal, transmitting, by the device, an indication of the first region to the transmission-reception point.

10. The method of claim 6, wherein the information associated with the reflector comprises one or more of: a plurality of angles of departure, a dominant angle of departure among the plurality of angles of departure, a shape of the reflector, a position of the reflector, an orientation of the reflector, a reflection coefficient of the reflector, a velocity of the reflector, or a velocity vector of the reflector.

11. An apparatus, comprising:

at least one processor; and an interface, wherein the at least one processor is configured to cause the interface to:

transmit a list of virtual transmission points to a device in a wireless communication environment, the list of virtual transmission points belonging to a plurality of lists, the list of virtual transmission points comprising a virtual transmission point visible from a location in a first region of a plurality of regions of the wireless communication environment, the virtual transmission point being associated with a reflector in the wireless communication environment, and wherein each list of the plurality of lists corresponds to a respective region of the plurality of regions; and transmit a signal to the device, based on information associated with the reflector.

12. The apparatus of claim 11, wherein the at least one processor is further configured to cause the interface to receive an indication of a second region of the plurality of regions.

13. The apparatus of claim 11, wherein the at least one processor is further configured to:

obtain an updated list of virtual transmission points; and cause the interface to transmit the updated list of virtual transmission points to the device.

14. The apparatus of claim 11, wherein the at least one processor is further configured to cause the interface to receive an indication of the first region from the device prior to transmitting the signal.

15. The apparatus of claim 11, wherein the information associated with the reflector comprises one or more of: a plurality of angles of departure, a dominant angle of departure among the plurality of angles of departure, a shape of the reflector, a position of the reflector, an orientation of the reflector, a reflection coefficient of the reflector, a velocity of the reflector, or a velocity vector of the reflector.

16. An apparatus comprising:

at least one processor; and an interface, wherein the at least one processor is configured to cause the interface to:

receive a list of virtual transmission points from a transmission-reception point, the list of virtual transmission points belonging to a plurality of lists, the list of virtual transmission points comprising a virtual transmission point visible from a location in a first region of a plurality of regions of a wireless communication environment, the virtual transmission point being associated with a reflector in the wireless communication environment, and wherein each list of the plurality of lists corresponds to a respective region of the plurality of regions; and receive a signal from the transmission-reception point based on information associated with the reflector.

17. The apparatus of claim 16, wherein the at least one processor is further configured to cause the interface to transmit an indication of a second region of the plurality of regions to the transmission-reception point.

18. The apparatus of claim 16, wherein the at least one processor is further configured to cause the interface to receive an updated list of virtual transmission points from the transmission-reception point.

19. The apparatus of claim 16, wherein the at least one processor is further configured to cause the interface to transmit an indication of the first region to the transmission-reception point prior to receiving the signal.

20. The apparatus of claim 16, wherein the information associated with the reflector comprises one or more of: a plurality of angles of departure, a dominant angle of departure among the plurality of angles of departure, a shape of the reflector, a position of the reflector, an orientation of the reflector, a reflection coefficient of the reflector, a velocity of the reflector, or a velocity vector of the reflector.

* * * * *